US012498971B2

United States Patent
Jia

(10) Patent No.: US 12,498,971 B2
(45) Date of Patent: Dec. 16, 2025

(54) DETERMINATION OF A NEXT TASK OF A TARGET NETWORK LAYER TASK FOR A TASK SCHEDULING BASED ON DEPENDENCIES AND REGISTER CONFIGURATION

(71) Applicant: Suzhou MetaBrain Intelligent Technology Co., Ltd., Suzhou (CN)

(72) Inventor: Zhaorong Jia, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/725,590

(22) PCT Filed: Jun. 30, 2022

(86) PCT No.: PCT/CN2022/102769
§ 371 (c)(1),
(2) Date: Jun. 28, 2024

(87) PCT Pub. No.: WO2023/201893
PCT Pub. Date: Oct. 26, 2023

(65) Prior Publication Data
US 2024/0385878 A1   Nov. 21, 2024

(30) Foreign Application Priority Data
Apr. 20, 2022  (CN) .......................... 202210413206.1

(51) Int. Cl.
*G06F 9/48*  (2006.01)
(52) U.S. Cl.
CPC ...... *G06F 9/4881* (2013.01); *G06F 2209/486* (2013.01)
(58) Field of Classification Search
None
See application file for complete search history.

(56) References Cited

U.S. PATENT DOCUMENTS

| 6,654,730 B1 * | 11/2003 | Kato ...................... G06N 3/063 706/15 |
| 6,871,343 B1 | 3/2005 | Yoshikawa |

(Continued)

FOREIGN PATENT DOCUMENTS

| CN | 109978129 A | 7/2019 |
| CN | 109993683 A | 7/2019 |

(Continued)

OTHER PUBLICATIONS

International Search Report and Written Opinion of International Searching Authority of corresponding PCT application (PCT/CN2022/102769) Oct. 8, 2022 including English translation (17 pages).

(Continued)

*Primary Examiner* — Aimee Li
*Assistant Examiner* — Zujia Xu
(74) *Attorney, Agent, or Firm* — Crowell & Moring LLP

(57) ABSTRACT

A computing task scheduling method and apparatus, an electronic device, and a computer readable storage medium are disclosed. The method includes: acquiring network description data; determining a dependency relationship between network layer tasks on the basis of the network description data; detecting an idle register group on an artificial intelligence accelerated computing component; generating a target register configuration on the basis of the dependency relationship, the network description data, and a type of the idle register group, and writing the target register configuration into the idle register group; and if a target network layer task completion notification is detected, determining, on the basis of the dependency relationship, a next task of a target network layer task corresponding to the target network layer task completion notification, and starting the next task on a corresponding first function module on (Continued)

the artificial intelligence accelerated computing component so as to execute the next task.

16 Claims, 15 Drawing Sheets

(56) References Cited

U.S. PATENT DOCUMENTS

| | | | | |
|---|---|---|---|---|
| 8,423,728 | B1* | 4/2013 | Yu | G06F 3/0613 |
| | | | | 711/158 |
| 11,068,641 | B1 | 7/2021 | Wu et al. | |
| 11,080,026 | B1* | 8/2021 | Kogelman | G06F 8/34 |
| 11,442,794 | B1* | 9/2022 | Borkovic | G06F 9/30098 |
| 2006/0010308 | A1* | 1/2006 | Haruki | G06F 9/30123 |
| | | | | 712/228 |
| 2007/0070075 | A1* | 3/2007 | Hsu | G06T 15/005 |
| | | | | 345/559 |
| 2007/0211287 | A1* | 9/2007 | Fujii | H04N 1/32363 |
| | | | | 358/1.16 |
| 2010/0037037 | A1* | 2/2010 | Lee | G06F 9/3885 |
| | | | | 712/E9.023 |
| 2012/0226960 | A1* | 9/2012 | Grube | H04L 41/0853 |
| | | | | 714/763 |
| 2014/0059160 | A1* | 2/2014 | Chernoff | H04L 49/356 |
| | | | | 709/224 |
| 2014/0173718 | A1* | 6/2014 | Kodama | G06F 21/629 |
| | | | | 726/19 |
| 2016/0085523 | A1* | 3/2016 | Hall | G06F 8/48 |
| | | | | 717/140 |
| 2017/0132020 | A1* | 5/2017 | Wang | G06F 9/44542 |
| 2017/0365306 | A1* | 12/2017 | Ouyang | G11C 7/1072 |
| 2019/0213776 | A1* | 7/2019 | Banerjee | G06F 9/4881 |
| 2020/0210821 | A1* | 7/2020 | Guo | G06N 3/105 |
| 2020/0285942 | A1* | 9/2020 | Yan | G06N 3/045 |
| 2021/0073669 | A1* | 3/2021 | Banerjee | G06N 3/045 |
| 2021/0144027 | A1* | 5/2021 | Su | H04L 45/74 |
| 2021/0157283 | A1 | 5/2021 | Abeloe | |
| 2022/0147801 | A1* | 5/2022 | Davidi | G06N 3/10 |
| 2022/0365762 | A1* | 11/2022 | Xiong | G06N 3/10 |
| 2023/0082994 | A1* | 3/2023 | Yang | G06N 3/04 |
| | | | | 706/25 |
| 2024/0098539 | A1* | 3/2024 | Huang | H04W 36/0088 |

FOREIGN PATENT DOCUMENTS

| | | |
|---|---|---|
| CN | 111275181 A | 6/2020 |
| CN | 112291293 A | 1/2021 |
| CN | 112711475 A | 4/2021 |
| CN | 112949847 A | 6/2021 |
| CN | 113448692 A | 9/2021 |
| CN | 113961333 A | 1/2022 |
| CN | 114239816 A | 3/2022 |
| CN | 114510339 A | 5/2022 |

OTHER PUBLICATIONS

Search report of corresponding CN priority application (CN2022104132061) Apr. 20, 2022 (2 pages).
Supplementary search report of corresponding CN priority application (CN2022104132061) Jul. 4, 2022 (2 pages).
First Office Action of corresponding CN priority application (CN202210413206.1) Jun. 24, 2022 including English translation (9 pages).
Notification to Grant Patent Right for Invention of corresponding CN priority application (CN202210413206.1) Jul. 4, 2022 including English translation (3 pages).
Kostić, Srđan, et al., Assessment of Blast Induced Ground Vibrations by Artificial Neural Network, 2014 12th Symposium on Neural Network Applications in Electrical Engineering (Neurel) School of Electrical Engineering, University of Belgrade, Serbia, Nov. 25-27, 2014 (6 pages).
Wu, Jia-jun, et al, Task scheduling on network processor, Application Research of Computers, vol. 24 No. 8 Aug. 2007 with English abstract (5 pages).

* cited by examiner

DETERMINATION OF A NEXT TASK OF A TARGET NETWORK LAYER TASK FOR A TASK SCHEDULING BASED ON DEPENDENCIES AND REGISTER CONFIGURATION

This application is the national phase application of International Patent Application No. PCT/CN2022/102769, filed Jun. 30, 2022, which claims priority to Chinese Patent Application No. 202210413206.1, entitled "COMPUTING TASK SCHEDULING METHOD AND APPARATUS, ELECTRONIC DEVICE, AND READABLE STORAGE MEDIUM", filed to China National Intellectual Property Administration on Apr. 20, 2022. The contents of International Patent Application No. PCT/CN2022/102769 and Chinese Patent Application No. 202210413206.1 are each incorporated by reference herein in their entireties.

FIELD

The present application relates to the technical field of neural networks, and particularly to a computing task scheduling method, a computing task scheduling apparatus, an electronic device, and a computer readable storage medium.

BACKGROUND

An artificial intelligence accelerated engine (AI engine) is an accelerated computing component specially designed for a deep learning algorithm. The convolutional neural network (CNN) structure commonly used in the deep learning algorithm usually contains multiple convolution combination layers, and each convolution combination layer in turn includes convolution, activation, pooling, and other small layers. The convolution combination layers are used for extracting different features in an image, and one CNN usually contains tens or even hundreds of convolution combination layers. When a hardware structure of the AI engine is fixed, its theoretical computility is fixed. However, in practical application, the computing efficiency of the AI engine is low due to overheads such as configuration time, data transmission time, and latency caused by incoordination between modules.

Therefore, the problem of low computing efficiency of the AI engine existing in the related art is a technical problem to be solved by a person skilled in the art.

SUMMARY

The present application provides a computing task scheduling method, applied to a task scheduler, the method including:
  acquiring network description data, the network description data being used for describing network layer tasks corresponding to each of network layers in a target neural network;
  determining a dependency relationship between the network layer tasks on the basis of the network description data;
  detecting an idle register group on an artificial intelligence accelerated computing component, each function module on the artificial intelligence accelerated computing component corresponding to at least two register groups;
  generating a target register configuration on the basis of the dependency relationship, the network description data, and a type of the idle register group, and writing the target register configuration into the idle register group; and
  in response to detecting a target network layer task completion notification, determining, on the basis of the dependency relationship, a next task of a target network layer task corresponding to the target network layer task completion notification, and starting the next task on a corresponding first function module on the artificial intelligence accelerated computing component so as to execute the next task.

Optionally, a generation process of the network description data includes:
  determining a hardware architecture of the artificial intelligence accelerated computing component;
  generating corresponding hardware architecture description data on the basis of the hardware architecture; and
  acquiring the target neural network, and generating the network description data on the basis of the target neural network and the hardware architecture description data.

Optionally, the generating the network description data on the basis of the target neural network and the hardware architecture description data includes:
  performing model parsing on the target neural network to obtain an intermediate graph;
  performing graph optimization processing on the intermediate graph on the basis of the hardware architecture description data to obtain an optimized graph; and
  compiling the optimized graph to obtain the network description data.

Optionally, the generating the network description data on the basis of the target neural network and the hardware architecture description data includes:
  determining each of the network layers in the target neural network and the dependency relationship between the network layers;
  acquiring preset network layer description data corresponding to each network layer; and
  generating the network description data on the basis of the dependency relationship using the preset network layer description data.

Optionally, the determining a dependency relationship between the network layer tasks on the basis of the network description data includes:
  determining, from the network description data, network description sub-data corresponding to the network layer tasks;
  parsing the network description sub-data to obtain corresponding next network layer pointers; and
  obtaining the dependency relationship on the basis of the next network layer pointers.

Optionally, the detecting an idle register group on an artificial intelligence accelerated computing component includes:
  in response to being in an initialization phase, determining all register groups on the artificial intelligence accelerated computing component to be the idle register groups.

Optionally, the detecting an idle register group on an artificial intelligence accelerated computing component includes:
  in response to not being in an initialization phase and detecting the target network layer task completion notification, determining a second function module corresponding to the target network layer task;

updating an idle register group identification corresponding to a type of the second function module in the network description data on the basis of the type of the second function module; and determining the idle register group corresponding to the second function module according to the updated idle register group identification, where the idle register group is one of two ping-pong register groups corresponding to the second function module.

Optionally, the generating a target register configuration on the basis of the dependency relationship, the network description data, and a type of the idle register group includes:

determining a candidate network layer task matching the type of the idle register group on the basis of the dependency relationship;

determining candidate description sub-data corresponding to the candidate network layer task in the network description data; and generating the target register configuration using the candidate description sub-data and the hardware architecture description data corresponding to the artificial intelligence accelerated computing component.

Optionally, the determining, on the basis of the dependency relationship, a next task of a target network layer task corresponding to the target network layer task completion notification includes:

parsing the target network layer task completion notification to obtain a task identification corresponding to the target network layer task;

determining subsequent tasks corresponding to the target network layer task using the task identification on the basis of the dependency relationship;

reducing an execution wait count corresponding to each of the subsequent tasks by one; and determining a target subsequent task that reduces the execution wait by one to zero to be the next task.

Optionally, the computing task scheduling method further includes:

determining an enabling order corresponding to each of target function modules on the artificial intelligence accelerated computing component on the basis of the dependency relationship; and enabling each of the target function modules on the basis of a reverse order of the enabling order so that an enabled target function module performs a data computing preparation operation on the basis of a corresponding non-idle register group.

The present application also provides a computing task scheduling apparatus, applied to a task scheduler, the apparatus including:

a network description acquisition module, configured to acquire network description data, the network description data being used for describing network layer tasks corresponding to network layers in a target neural network;

a dependency determination module, configured to determine a dependency relationship between the network layer tasks on the basis of the network description data;

an idle detection module, configured to detect an idle register group on an artificial intelligence accelerated computing component, each function module on the artificial intelligence accelerated computing component corresponding to at least two register groups;

a register configuration module, configured to generate a target register configuration on the basis of the dependency relationship, the network description data, and a type of the idle register group, and write the target register configuration into the idle register group; and a starting module, configured to in response to detecting a target network layer task completion notification, determine, on the basis of the dependency relationship, a next task of a target network layer task corresponding to the target network layer task completion notification, and start the next task on a corresponding first function module on the artificial intelligence accelerated computing component so as to execute the next task.

The present application also provides an electronic device, including a memory and one or more processors, the memory storing computer readable instructions which, when executed by the one or more processors, cause the one or more processors to perform the steps of the above-mentioned computing task scheduling method.

The present application also provides one or more non-volatile computer readable storage media storing computer readable instructions which, when executed by one or more processors, cause the one or more processors to perform the steps of the computing task scheduling method.

BRIEF DESCRIPTION OF THE DRAWINGS

In order to describe the embodiments of the present application or the technical solutions in the existing art more clearly, drawings required to be used in the embodiments or the illustration of the existing art will be briefly introduced below. Apparently, the drawings in the illustration below are only some embodiments of the present application. A person skilled in the art also can obtain other drawings according to the provided drawings without creative work.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by a person skilled in the art without creative work shall fall within the protection scope of the present application.

An AI engine (also referred to as an artificial intelligence accelerated component) is an accelerated computing component specially designed for a deep learning algorithm. The CNN structure commonly used in the deep learning algorithm usually contains multiple convolution combination layers, and each convolution combination layer in turn includes convolution, activation, pooling, and other small layers. The convolution combination layers are used for extracting different features in an image, and one CNN usually contains tens or even hundreds of convolution combination layers.

Figure 1:
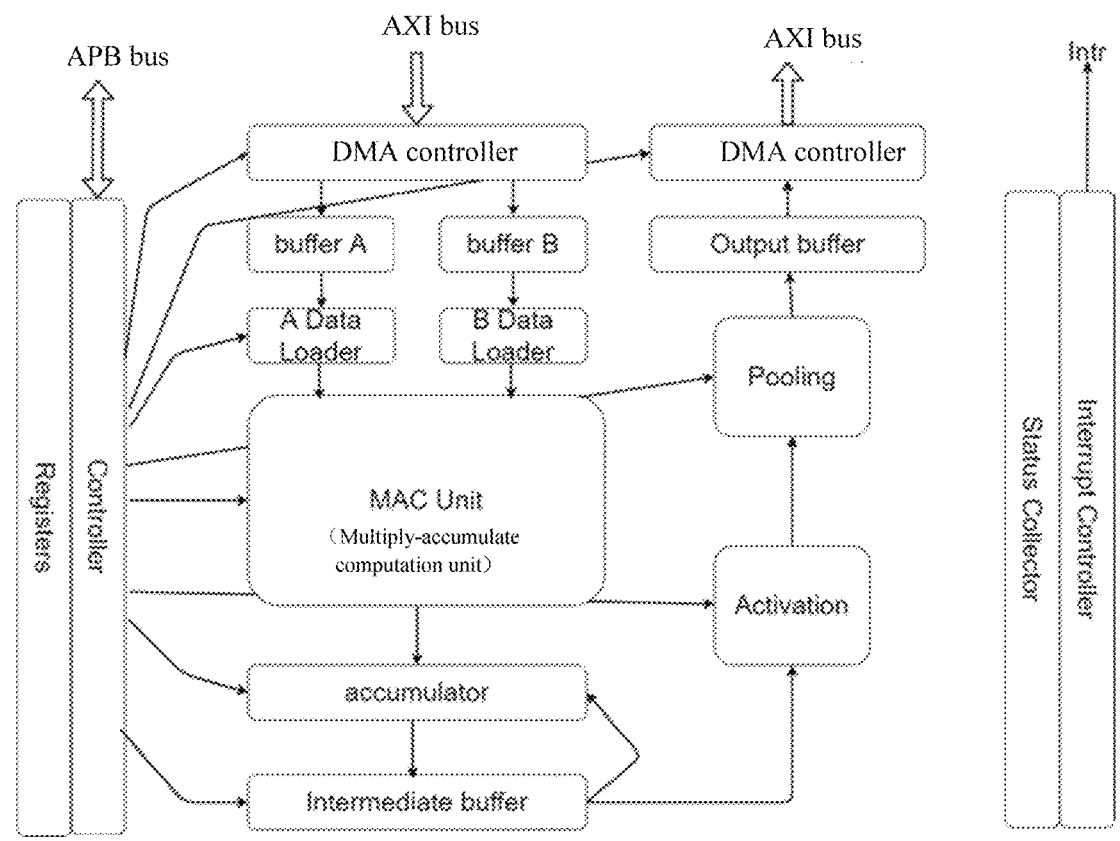
FIG. 1 is a schematic diagram of a hardware architecture of an AI engine provided by one or more embodiments of the present application.

In summary, in one implementation, a general structure of a task-based AI engine is shown in FIG. 1. The task-based AI engine contains: an interface bus advanced extensible interface (AXI), an advanced peripheral bus (APB), a direct memory access (DMA) module for reading and writing an external storage medium, a local buffer module, a data loader module for parallel data loading, a status monitoring (i.e., status collector) and interrupt controller, a MAC unit (or referred to as a multiply-accumulate computation module, one function module) responsible for computation, an activation unit (or referred to as an activation processing module, one function module), and a pooling unit (or referred to as a pooling processing module, one function module). A data reshape module, a normalization module, etc. may also be contained.

During application, registers (or a register group) receive configuration information of the modules, and the controller controls the operation of the modules according to these configurations. The controller may exist in various manners, and FIG. 1 shows a centralized controller. In addition, the controller may also be a decentralized controller, i.e., various controllers are located inside various modules, and these modules are mounted on the APB or connected in a daisy chain manner.

The status collector monitors information of each module, such as a size of buffer idle space, a running status of each module, a number of reading and writing data, a blocking duration, or an idle duration, and provides the interrupt controller with the interrupt pending of each module, such as DMA reading data complete interruption pending, MAC unit computing complete interruption pending, activation activating complete interruption pending, and pooling complete interruption pending. An interrupt pending register is provided in the interrupt controller, and each bitmap of the pending register represents a pending signal of each function module. In addition, an interrupt mask register and an interrupt enable register are also provided. When an interruption is enabled and not masked, an interruption signal Intr is generated when the pending is in position 1. Specifically, which module of the AI engine has completed a task and generated an interruption may be determined by querying the pending register. It can be seen that the process of calling the AI engine to accelerate the computation is a process of continuously configuring registers and waiting for an interruption.

One CNN network has tens or hundreds of combination layers, and if a computation amount of a single combination layer exceeds the computation capacity of the AI engine, the single combination layer needs to be split into multiple sub-combination layers. Each combination layer may contain various operations such as load data, multiply-accumulate operation, activation, pooling, normalization, and fusion, and multiple modules need to called together to complete an operation task of one combination layer. It can be seen that to complete one inference task of the CNN, each module needs to complete hundreds or thousands of tasks, and the modules need to cooperate with each other.

In order to ensure that the AI engine works with a high computing efficiency, it is necessary to make each of the function modules compute in parallel as much as possible, and each computing task is processed in the form of pipeline. In addition, it is also necessary to reduce a duration that a function module does not perform computation as much as possible, and make balanced use of bandwidth resources, etc. In order to achieve this effect, the present application designs a task scheduler. The task scheduler may be configured to schedule tasks on the AI engine so that the AI engine may compute efficiently. The embodiment does not define the specific form of the task scheduler. In one implementation, the role of the task scheduler may be taken by a processor in an artificial intelligence accelerated computing device (AI device), and the AI device may have any number of AI engines. Each AI engine may correspond to one processor, or multiple AI engines correspond to one processor.

In order to have the function of flexibly scheduling computing tasks, the task scheduler may have the following features.

1. Universality and extensibility: manufacturers, application scenarios, and applicable optimal CNN networks are different, so the function modules and combination manners of the AI engine are different but have the same basic architecture. Therefore, the task scheduler may take into account the universality and extensibility so as to adapt to different AI engines.

2. Combination and pipeline of the modules in the AI engine: the combination modes and pipeline orders of the modules in each layer of the CNN are different. The functions implemented by the modules are different, the registers needing to be configured therein are also different, and the configuration modes of different function modules are also different. Therefore, the task scheduler should be able to automatically switch the modules needing to be configured according to any kind of CNN network structure, and also need to realize different configuration modes and switch with the modules synchronously.

3. Enabling opportunities of the modules in the AI engine: in order to improve the computing efficiency of the AI engine, a certain function module is usually configured in a previous layer of the CNN or during the running of other function modules, and then enabled when the module is executed. That is, a configuration logic of a module is unrelated to an enabling logic of the module. If a certain two layers of the CNN are all convolution+activation+pooling combinations, when the current layer performs an operation, the configuration required by the operation of the next layer is configured, and this mechanism enables the operation and configuration to be performed simultaneously, saving the configuration time. After the operation of the current layer is finished, the operation of the next layer is started directly so that the module runs continuously, improving the operation efficiency of the module. In order to achieve this effect, each function module in the present application corresponds to at least two groups of configuration registers, i.e., two register groups. In one implementation, there may be two register groups that form a ping-pong configuration mode. In the same layer, the enabling of the modules is also sequential. As the above-mentioned example, it is necessary to enable the pooling module first, then enable the activation module, and finally enable the convolution module, i.e., the final executed module is first enabled so that the subsequent module ready to receive an operation result of the previous module in advance, otherwise, the result of data loss may occur. It can be seen that the configuration of modules and the enabling of modules are two sets of unrelated logics. This mechanism effectively realizes the pipeline between modules, and the task scheduler should be able to support such scheduling.

4. Data Description: the essence of a program is logic and data. Therefore, the task scheduler should be able to use data to describe various flow nodes involved in a task scheduling flow, such as input/output (I/O) data, a CNN structure, various function modules of the AI engine, tasks of the AI engine, operations of each step, connections between modules of the AI engine, and the enabling logic of a module.

In summary, the flow of the task scheduler during working may be summarized as: configuring registers→running modules→completing running and generating an interruption. Specifically, according to the control of the task scheduler, the AI engine uses each of the function modules to work in the process of: reading task data→initializing all available modules→updating a module enabling sequence→a module with enabling sequence being 0→waiting for an interruption→configuring another group of registers of the module or registers of the next used module→updating the module enabling sequence after receiving the interruption→enabling the module with enabling sequence being 0→waiting for an interruption→ . . . In this process, specific steps will be described later.

Figure 2:
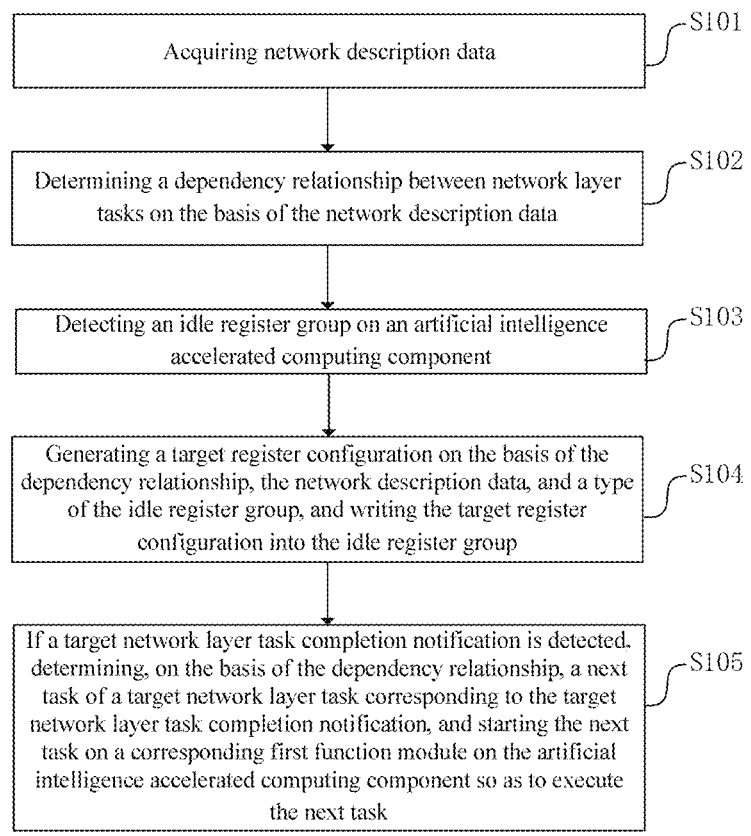
FIG. 2 is a flowchart of a computing task scheduling method provided by one or more embodiments of the present application.

Referring to FIG. 2, it is a flowchart of a computing task scheduling method provided by an embodiment of the present application. The method includes the following steps.

At S101, network description data is acquired.

The network description data is used for describing network layer tasks corresponding to network layers in a target neural network, and the network layer tasks refer to tasks that infer and compute the network layers. According to the above-mentioned description, the network description data is influenced by a network structure of a neural network and a hardware structure of the AI engine. The network description data may be acquired from other electronic devices or may be generated by an electronic device having a task scheduler.

Figure 3:
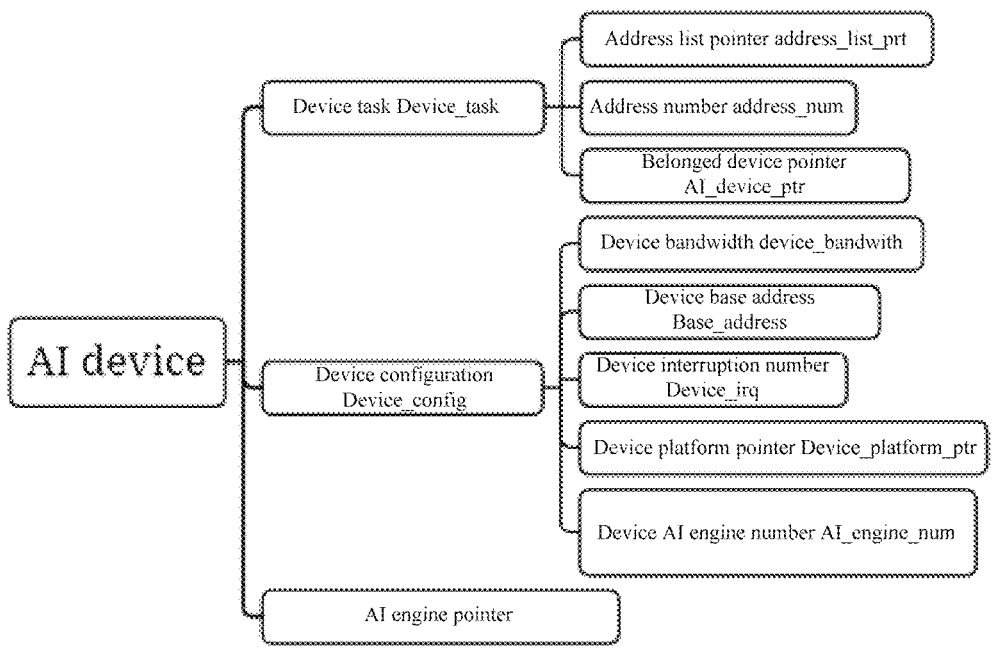
FIG. 3 is a structure diagram of hardware architecture description data of an AI acceleration device provided by one or more embodiments of the present application.

In a specific implementation, when generating the network description data, a hardware architecture of an artificial intelligence accelerated computing component is first determined, and corresponding hardware architecture description data is generated on the basis of the hardware architecture. The embodiment does not define the specific generation manner of the hardware architecture description data. In one implementation, a generation rule may be preset, and after the hardware architecture is obtained, the hardware architecture description data is generated on the basis of the generation rule. In another embodiment, preset hardware architecture description data corresponding to various hardware architectures may be pre-stored, and after the hardware architecture is determined, the corresponding hardware architecture description data is determined therefrom. In another implementation, after the hardware architecture is obtained, it may be outputted so as to manually input the hardware architecture description data. Referring to FIG. 3, it shows hardware architecture description data of an AI device, including device_config configuration data required for initialization, a pointer AI_engine_ptr described by the AI engine configured on the device, and task description Device_task data processed by the device. The device task Device_task is generally a combination of a series of subtasks, and each subtask has input data, output data, and other parameter data. These data are written into a storage space memory accessible by a slave (i.e., AI Device) when a host (i.e., master) issues tasks, and the slave needs to acquire addresses of these task data when processing these tasks. These addresses are combined into address_list. The number of data addresses in the address_list is address_num. The AI_device_ptr points to a device to which the task belongs, and is used for distinguishing an executor (i.e., slave) of the task. The device configuration Device_config is data for initializing the device, including information such as a base address base_address of the device on a system bus, an interruption number Device_irq of the device in the system, the device platform pointer, and the number of the AI engine contained on the device.

Figure 4:
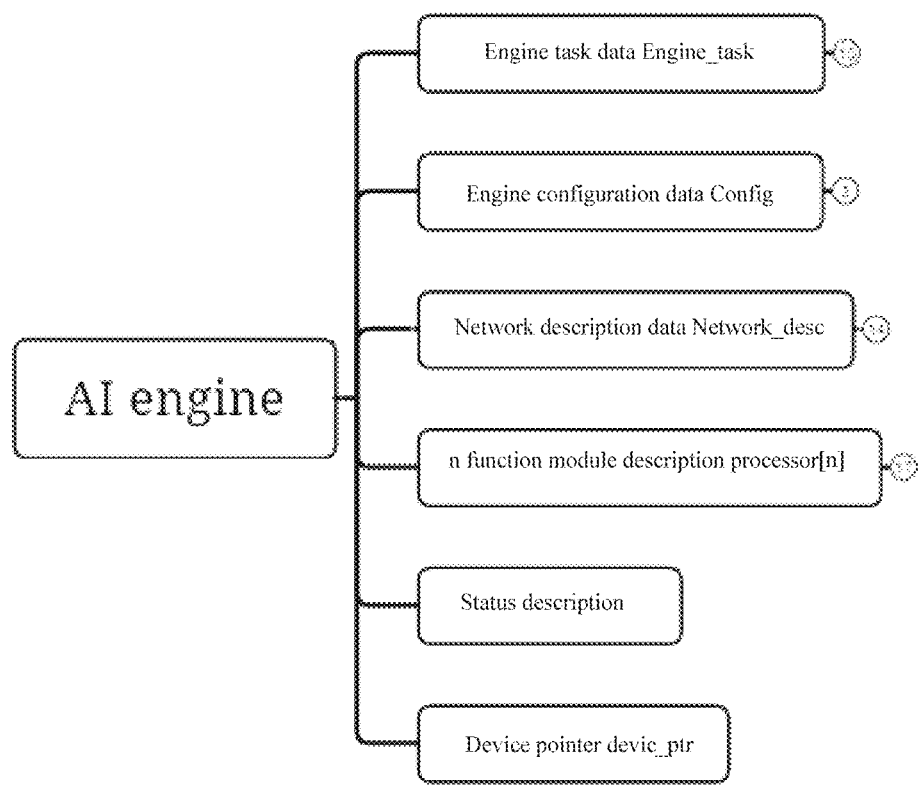
FIG. 4 is a data structure diagram of an AI engine provided by one or more embodiments of the present application.

In addition to describing the device, the AI engine in the device may also be described in the form of a data structure. Referring to FIG. 4, it is a data description structure diagram of an AI engine provided by an embodiment of the present application. The description data of the AI engine contains contents such as a task of the engine, a configuration config of the engine, a CNN network description network_desc (i.e., network description data) to be inferred by the engine, the description of a function module processor in the engine, an engine status, and an engine device pointer. The status description and the device pointer describe the status of the AI engine and indicate the device to which the AI engine belongs, respectively.

Figure 5:
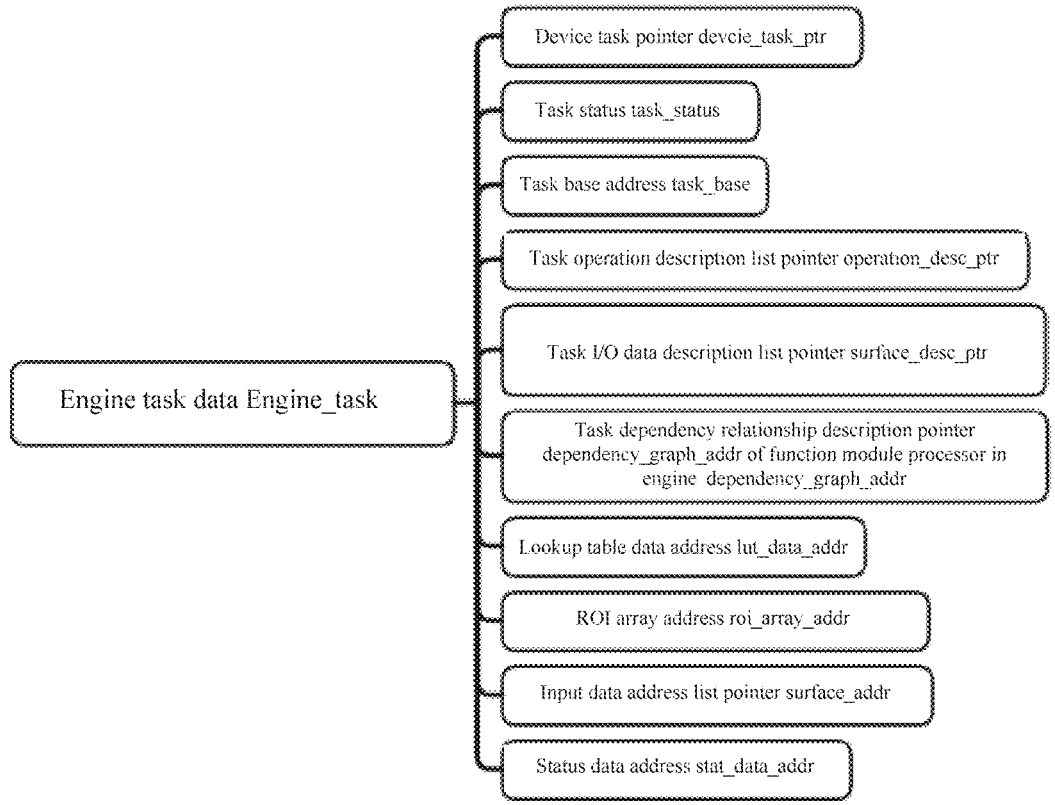
FIG. 5 is a data structure diagram of engine task data provided by one or more embodiments of the present application.

Specifically, the task data of the AI engine is described as Engine_task, and referring to FIG. 5, and the Engine_task includes the following contents.

A device task pointer device_task_ptr: the pointer points to the device task device_task, indicating a source of the task, and is also configured to index relevant information of the device task device_task, such as an address list where the data involved in the task is located and the number of addresses.

A task status task_status: it is used for marking the status of task execution;

A task base address task_base: it is an address offset when used for indexing a task;

A task operation description list pointer operation_desc_ptr: during the CNN inference, tens or hundreds of convolution layers are usually contained, and a processor, such as convolution in the AI engine, is required to repeatedly process these convolution layers. Therefore, each processor (i.e., function module) has tens or hundreds of different task operation description data. These data are issued into the storage space of the AI engine through the master. Therefore, addresses of these task operation description data need to be indicated for the AI engine.

A task I/O data description pointer surface_desc_ptr: the description of the I/O data of the task, i.e., the I/O data of each convolution layer of the CNN, describes information such as a dimension size of the data, whether the data is closely arranged, whether the data is compressed, and whether there is an address jump.

A task dependency relationship description data address dependency_graph_addr: dependency_graph is a dependency relationship between task operations, and the task operation can only be enabled after all dependencies of the current task operation of the processor have been resolved. This configuration may allow the AI engine to automatically switch between tasks, improving the applicability of the AI engine to different CNN networks.

A lookup table data address lut_data_addr: a lookup table is configured to implement nonlinear computations, such as sigmoid nonlinear activation. The lookup table data needs to be written by the master into the storage space of the AI engine.

A region of interest (ROI) array address: in the field of image processing, the ROI is an image region selected from an image, and this region is the focus of image analysis. This region is delineated for further processing. ROI data also needs to be issued by the master to the storage space of the AI engine.

An I/O data address surface_addr: the I/O data refers to image input during inference or intermediate result data of an intermediate convolution layer.

Figure 6:
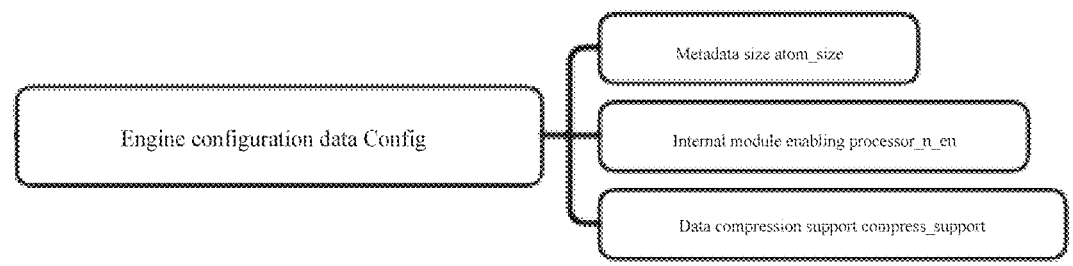
FIG. 6 is a data structure diagram of engine configuration data provided by one or more embodiments of the present application.

Referring to FIG. 6, engine configuration data mainly includes the following contents.

A metadata size atom_size: a bus bit width of the AI engine may usually be set as, for example, 256 bits or 512 bits so that the AI engine has a large data throughput capability and can process 32 or 64 int8 types of data in parallel.

Internal module enabling: different CNN inference uses different function modules, and not all the function modules of the AI engine can be used, so module processor enabling is set.

A data compression support compress_support: if data compression is supported, the AI engine needs to implement a data decompression function.

Figure 7:
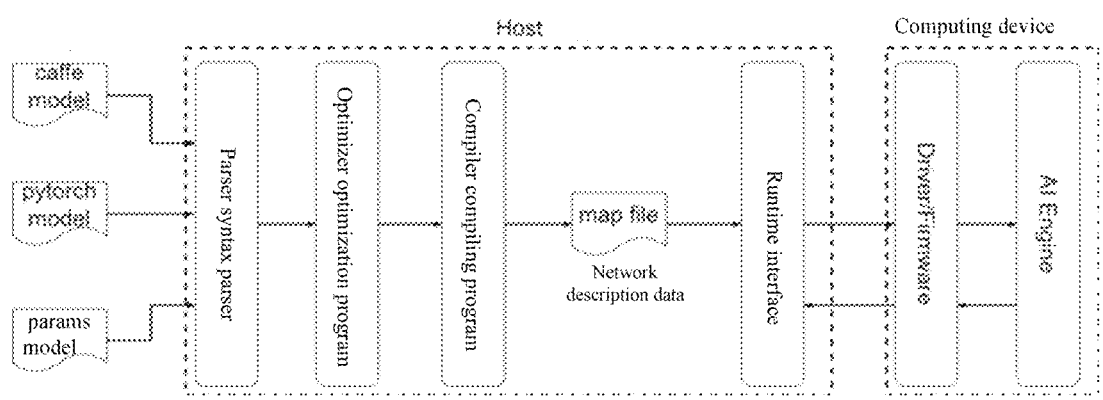
FIG. 7 is a flowchart of a generation process of network description data provided by one or more embodiments of the present application.

After the hardware architecture description data is obtained, a target neural network is acquired, where the target neural network is a neural network needing to be inferred and computed, and the network description data is generated on the basis of the target neural network and the hardware architecture description data. The embodiment does not define the specific generation process of the network description data. In one embodiment, preset network layer description data corresponding to the each of network layers may be preset. After the target neural network is acquired, the each of network layers in the target neural network and the dependency relationship between the network layers are determined, and the preset network layer description data corresponding to the each of network layers is acquired. The network description data may be obtained by synthesizing the preset network layer description data on the basis of the dependency relationship. In another implementation, referring to FIG. 7, model parsing may be performed on the target neural network to obtain an intermediate graph. As shown in FIG. 7, the target neural network may specifically be a model such as caffe model, pytorch model, and params. Model parsing is performed on the target neural network model and its corresponding configuration parameters through a parser (a kind of syntax parser), and a deep learning framework model is converted into a compiler-defined intermediate graph for representation. Graph optimization processing is performed on the intermediate graph on the basis of the hardware architecture description data to obtain an optimized graph. Specifically, an optimizer (an optimization program) performs graph optimization on the intermediate graph, and the optimization manner may specifically be: common subexpression elimination (CSE), operator fusion, storage optimization, etc. The optimized graph is compiled to obtain the network description data. The optimized intermediate graph (i.e., optimized graph) is compiled through the compiler to generate a map file (i.e., network description data) which may be deployed on the hardware. The map file is subsequently deployed on the device during runtime, and the driver or firmware (i.e., task scheduler) of the device calls resources of the AI Engine according to the map file to complete this AI inference computation and may also feed back the result to the runtime.

Figure 8:
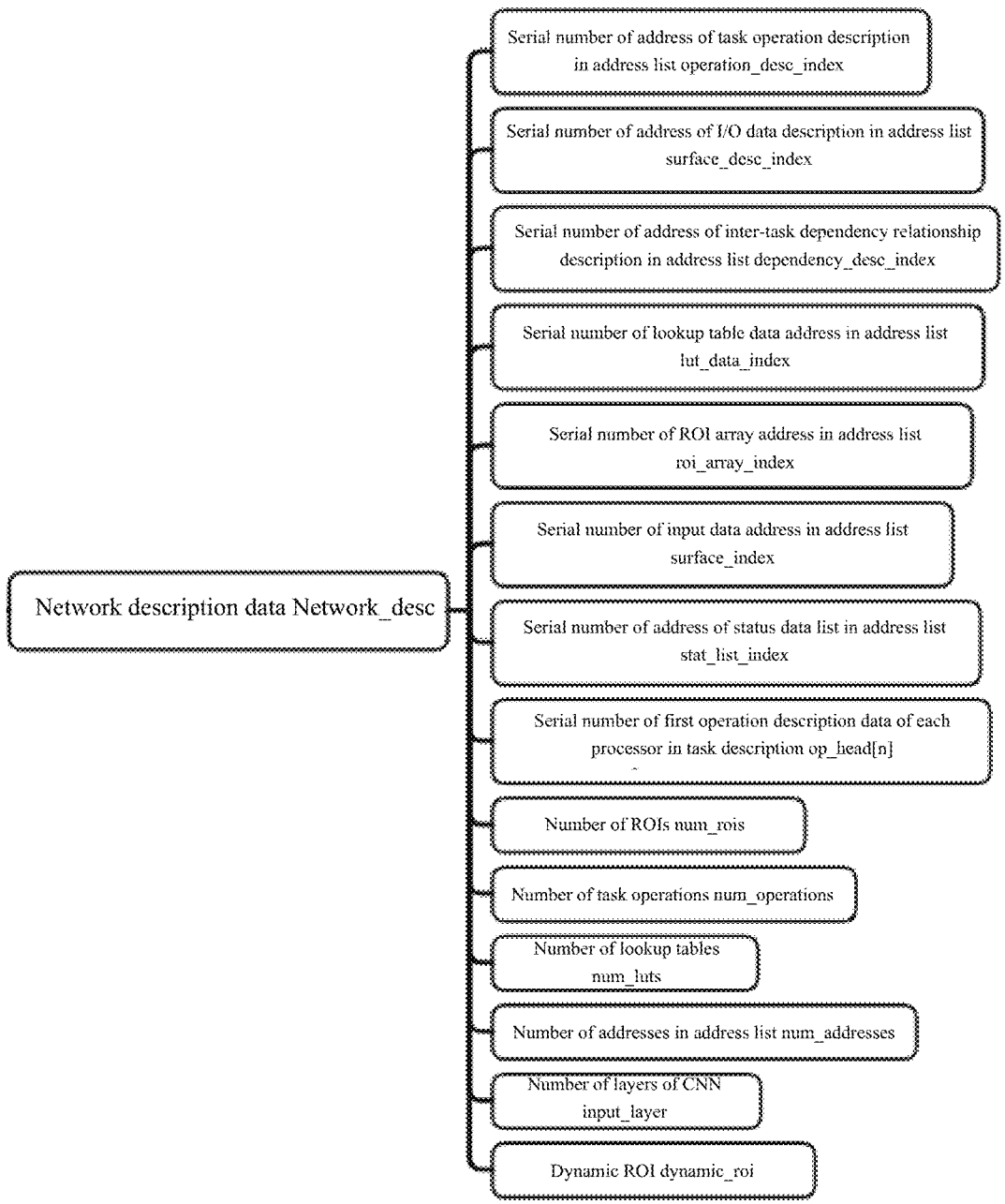
FIG. 8 is a data structure diagram of network description data provided by one or more embodiments of the present application.

Referring to FIG. 8, it shows a specific data structure diagram of neural network description data Network_desc. Processor operation description data operation_desc, I/O data description surface_desc, inter-task dependency relationship description dependency_desc, lookup table data lut_data, ROI data roi_array, status data stat_list, and start numbers of operation_desc of each processor are included. Since the CNN data is written into the storage space of the AI engine by the master, the AI engine needs to extract the data from the storage space on the basis of the CNN description Network_desc and participate in the operation during the inference computaion. The process of AI engine data extraction may be split into two steps. First, according to the index described by the Network_desc, an address of the data in the storage space is acquired from the address_list of the Device_task, and the address is written into the engine task for subsequent data reading. Second, the data is read from the storage space according to the address in the engine_task and participates in an inference operation.

In addition, the description data of the AI engine may also include description data of a function module processor.

Figure 9:
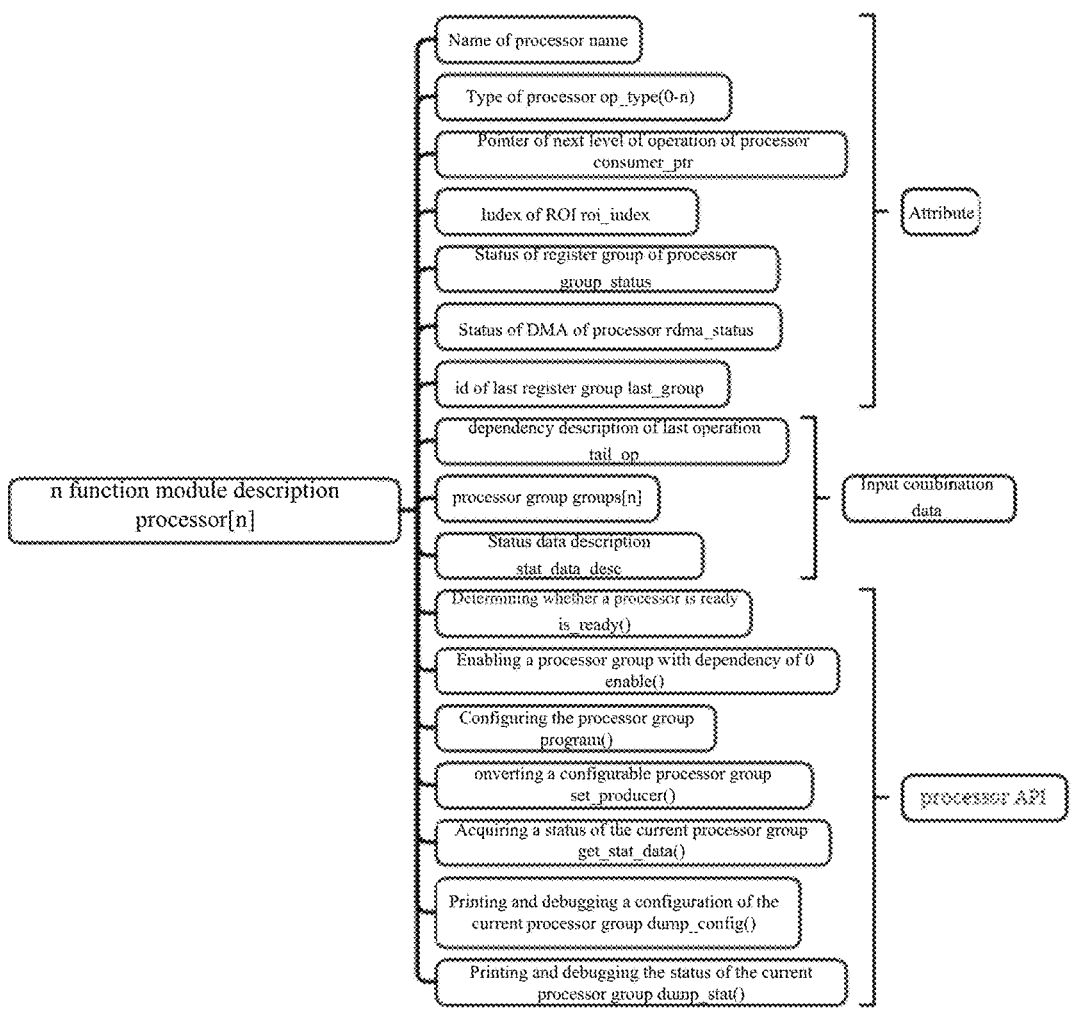
FIG. 9 is a data structure diagram of function module description data provided by one or more embodiments of the present application.

Referring to FIG. 9, the description of the processor may be divided into three parts: an attribute of the processor, input data of the processor, and a behavior function of the processor (i.e., API). Attribute data of the processor includes a name of the processor, a type of the processor (convolution, activation, pooling, etc.), a recipient or consumer of result data of the processor, or a next level of processor. In the implementation, each function module, i.e., processor, corresponds to two register groups, which are ping-pong register groups. Therefore, in the implementation, an id of the register group required for this operation may be computed using an id of the last used register group, and since there are only two register groups, the id is equal to 0 or 1. Input combination data (i.e., input data) includes dependency description tail_op, processor_group, and state description stat_data_desc. The three include all data required for the processor operation, including: dependency (for updating a pipline status and automatically enabling the processor), operation (operation data of the processor), surface_desc (information description of I/O data dimension, etc.), and surface (input data).

Figure 10:
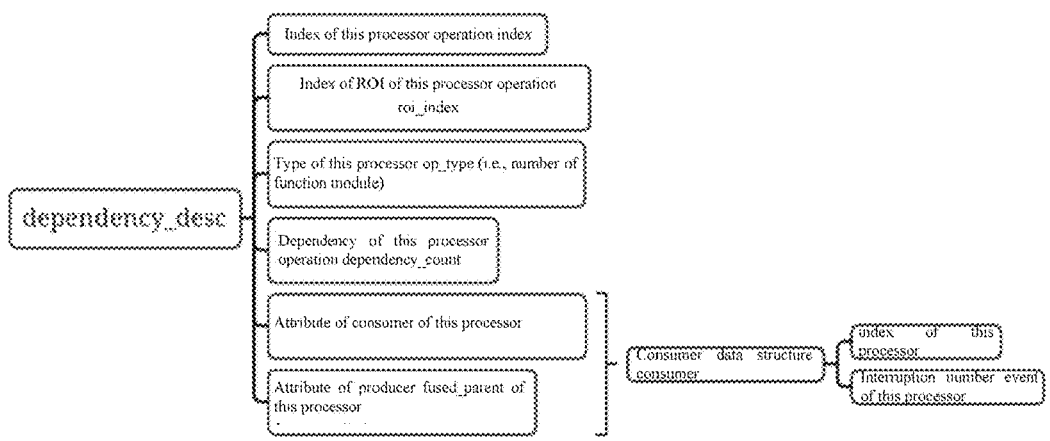
FIG. 10 is a data structure diagram of dependency description data provided by one or more embodiments of the present application.

FIG. 10 shows a kind of dependency description data, including an index (i.e., index table) of this processor operation, an operation type op_type, a dependency count dependency_count, and a producer of input data and a consumer of output data of this processor. The dependency description of the processor operation is the key of various processor pipelines in the AI engine. Each processor operation has the dependency description, and each dependency description records a previous level and a subsequent level of this operation so that all processors in the AI engine constitute a linked list. The dependency_count (i.e., execution wait count) determines whether the processor is enabled. Each processor updates the dependency after performing program ( ) or enable ( ) and the update operation is specifically a dependency (i.e., dependency_count) minus 1 operation. When the dependency_count of the processor is 0, the processor is enabled. The program ( ) of the processor is an operation on a corresponding module configuration register in the AI engine, and the enable ( ) is an operation enabling the processor to perform an inference operation.

Figure 11:
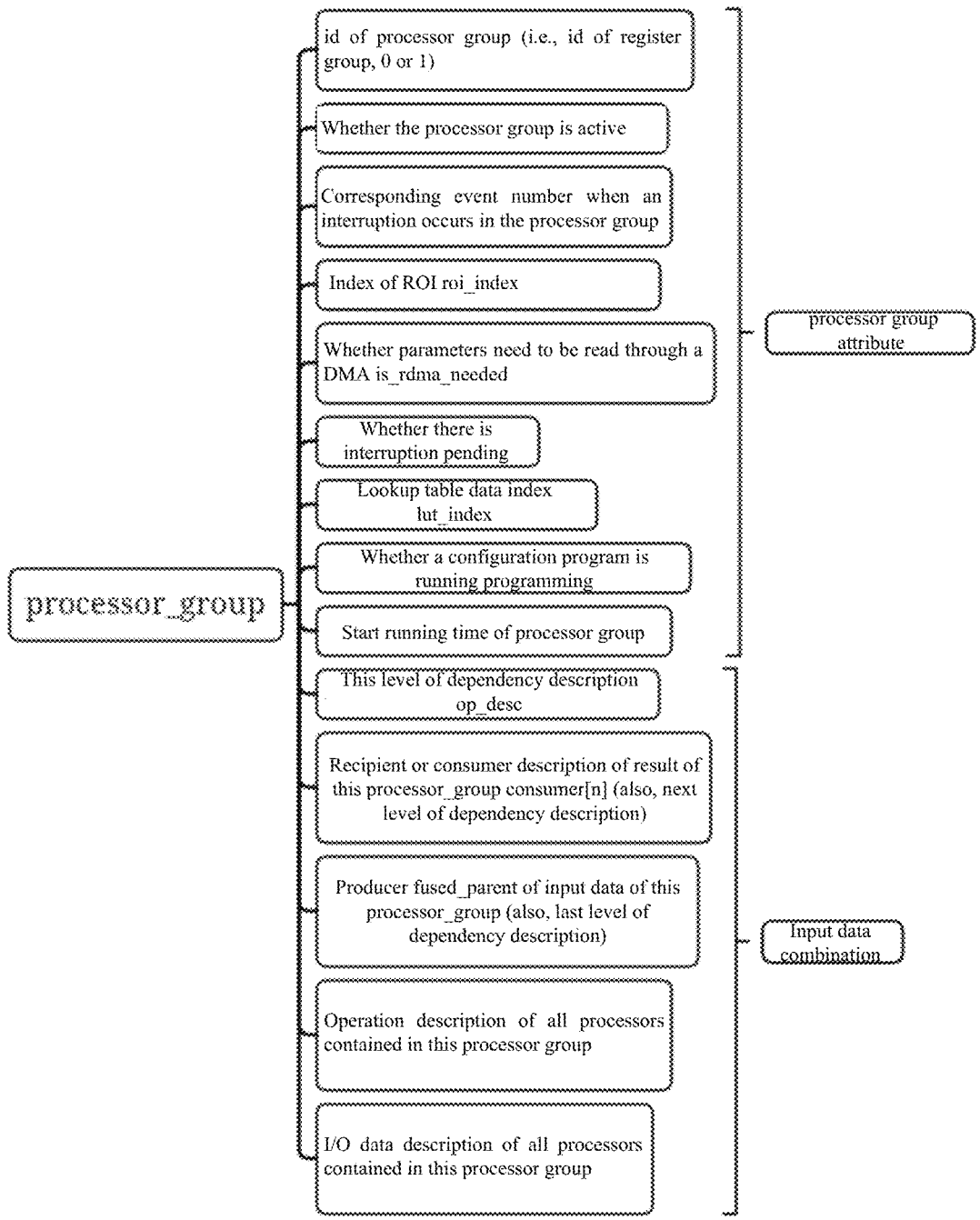
FIG. 11 is a data structure diagram of function module description data provided by one or more embodiments of the present application.

Referring to FIG. 11, it shows a specific data structure of processor group description data. The data of the processor is transmitted through the processor group, and each function module processor in the AI engine is provided with two groups of registers to control the continuous running of the processor with a ping-pong rotation mechanism without a gap. Therefore, a configuration operation of one group of registers is completed when the other group of registers controls the running of the processor, and this method shortens the time for the AI engine to execute a task and improves an operation efficiency of the AI engine. Since the register group controls the running of the processor, the processor group may be used to describe specific information of the register group needing to be configured and relevant information of the processor. It should be noted that the information needs to be generated when configuring the register, and a specific generation manner is not limited. Specifically, the id in FIG. 11 describes a register group number, and since there are only two groups of registers, the id is either 0 or 1. The active records whether the current processor is enabled. The event records the number of bits at the interrupt register after the interruption occurs in the current processor, i.e., an event position 1 in a 32-bit interrupt register after the processor operation is completed. The roi_index indicates a position of the current ROI when the ROI exists. The is_rdma_needed refers to whether the current processor operation needs to read other parameters from the outside to participate in the operation. The pending refers to that whether the current processor has an interruption that is not processed. The lut_index is a position of the address of the lookup table in the address_list when the processor is an active operation. This level of dependency is used for describing the dependency of the current processor and recording relevant information of the dependency. A last level of dependency and a next level of dependency are dependencies of parent and consumers. The current processor needs to update dependency_count of parent and consumers after program ( ) or enable ( ) It should be noted here that it is not the last level that is executed first, and the next level is executed later. For convolution→activation→pooling, it is necessary to enable 'pooling' first, then enable 'activation', and finally enable 'convolution', while the three basically perform operations at the same time. Since the three are in a pipeline, 'pooling' requires a result of 'activation' as an input, and likewise 'activation' requires a result of 'convolution' as an input. Therefore, from the perspective of the whole task processing process, the three perform operations at the same time.

Figure 12A:
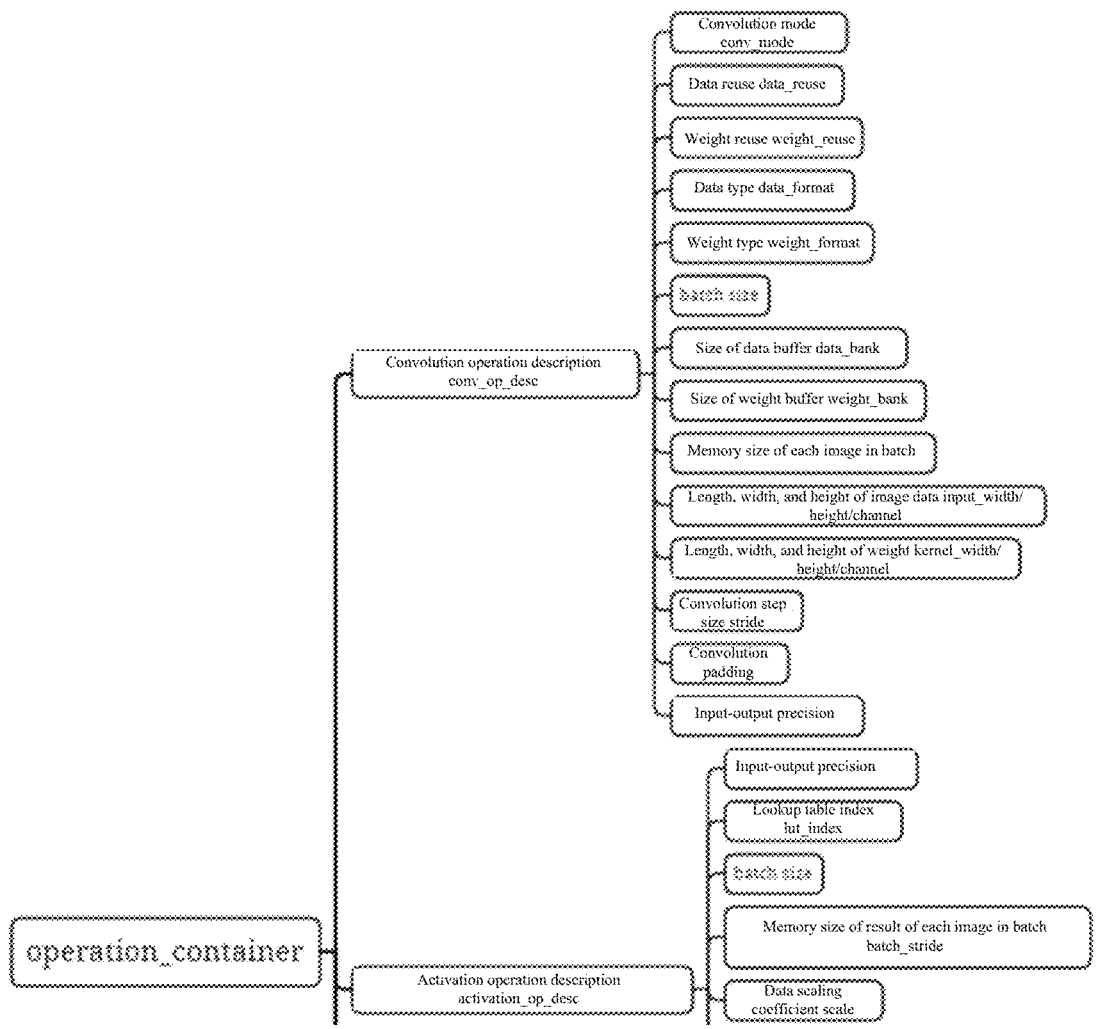
FIG. 12A is a first part of a data structure diagram of register description data provided by one or more embodiments of the present application.
Figure 12B:
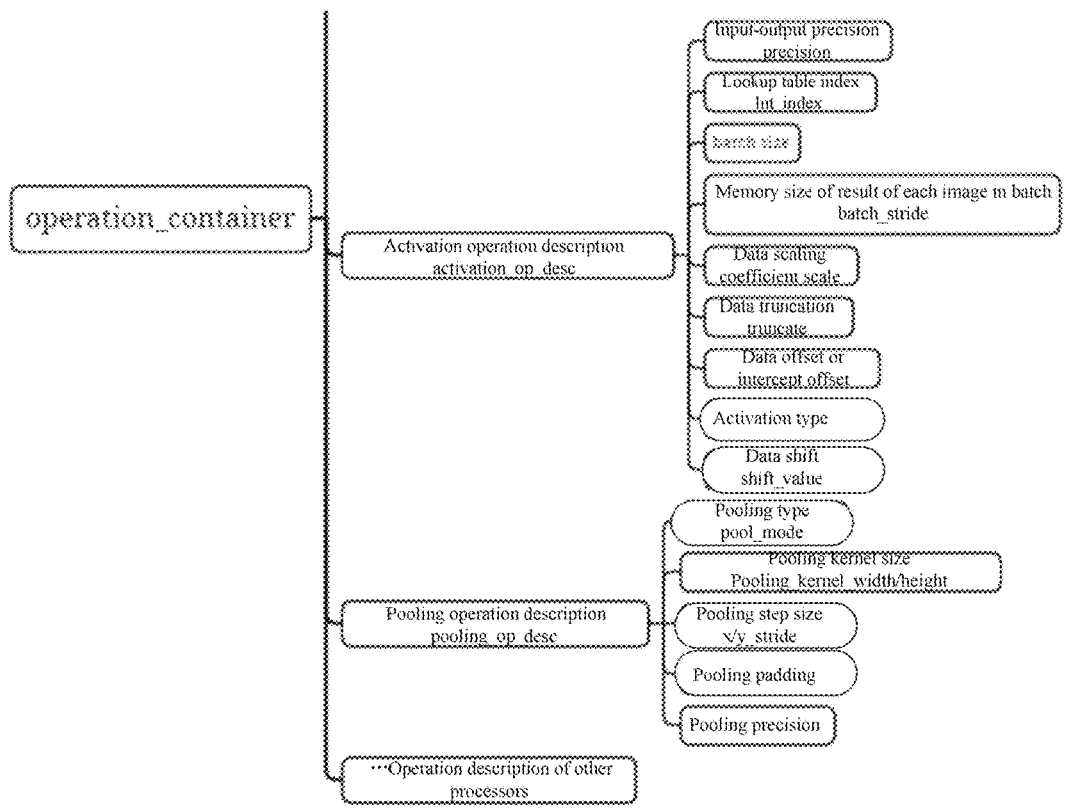
FIG. 12B is a second part of a data structure diagram of register description data provided by one or more embodiments of the present application.
Figure 13A:
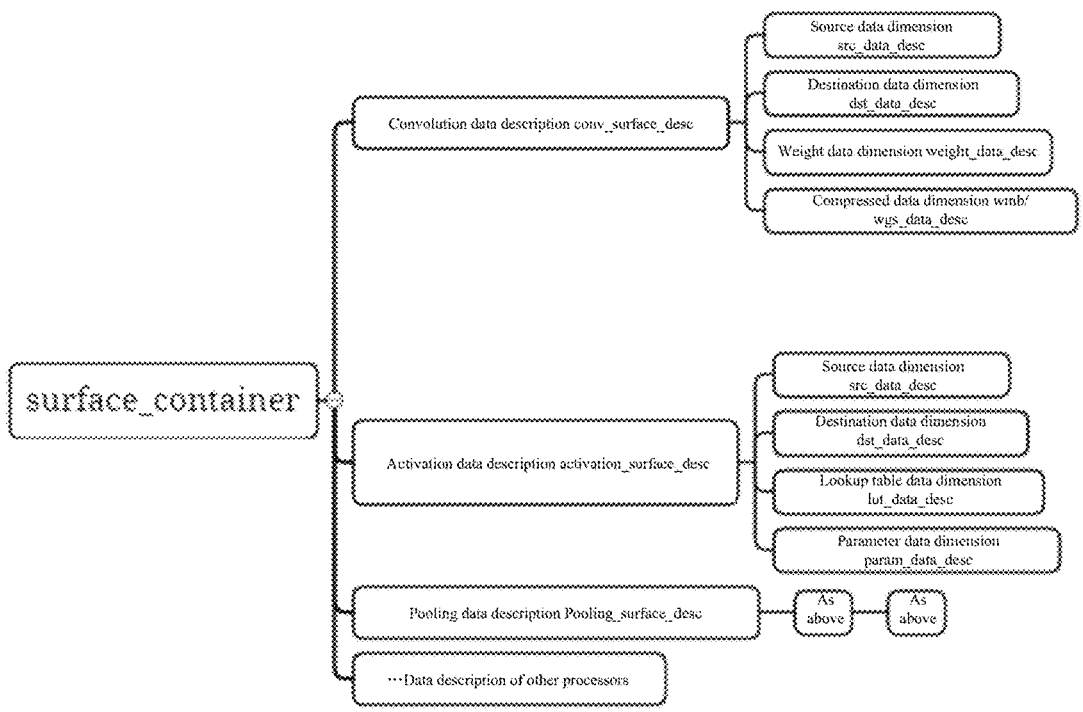
FIG. 13A is a data structure diagram of input-output manner description data provided by one or more embodiments of the present application.
Figure 13B:
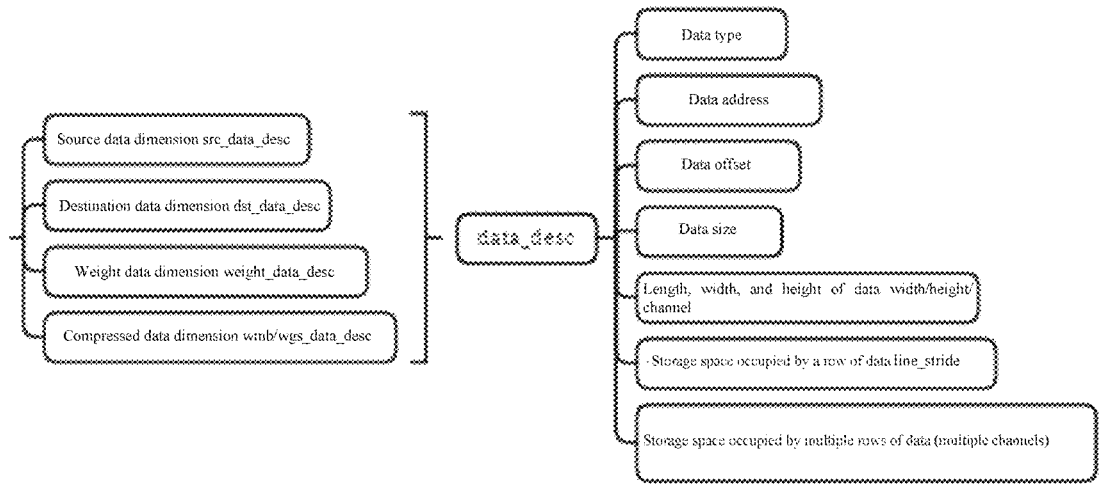
FIG. 13B is a specific data structure diagram of convolution data description data provided by one or more embodiments of the present application.
Figure 13C:
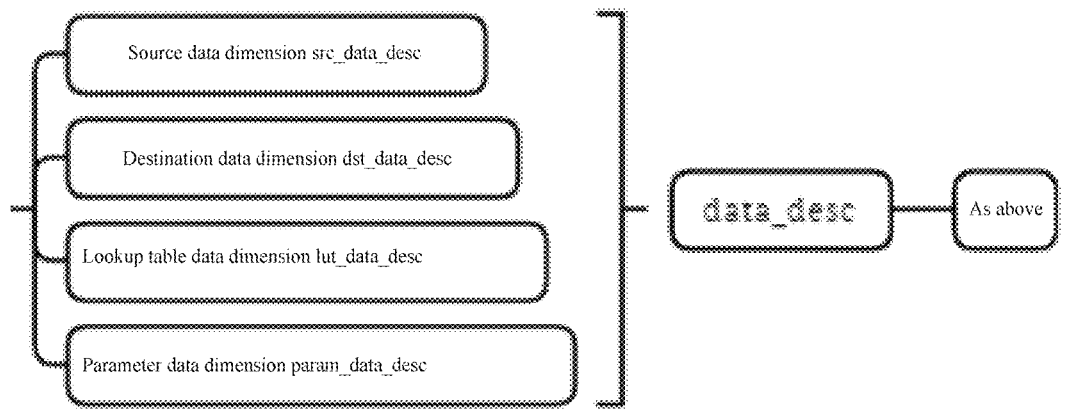
FIG. 13C is a specific data structure diagram of activation data description data provided by one or more embodiments of the present application.

The operation_container and surface_container are register data and I/O data information of the processor. Referring specifically to FIGS. 12A, 12B, 13A, 13B, and 13C, FIG. 12A is a first part of a data structure diagram of register description data provided by an embodiment of the present application, and FIG. 12B is a second part of a data structure diagram of register description data provided by an embodiment of the present application. The two parts together form a complete data structure diagram of register description data. FIG. 13A is a data structure diagram of input-output manner description data provided by an embodiment of the present application, FIG. 13B is a specific data structure diagram of convolution data description data provided by an embodiment of the present application, and FIG. 13C is a specific data structure diagram of activation data description data provided by an embodiment of the present application.

The operation_container contains information of all registers that the processor group needs to be configured and contains the operation description of n processor, where n is the number of the function module processor in the AI engine. In the example, the AI engine only has convolution, activation, and pooling. The content of the operation description of each processor is determined by a hardware design of the processor. For example, a convolution processor sets a convolution mode, data reuse, a data type, a batch size, a data buffer size, a size of convolution data and kernel, a step size, whether to padding, input-output precision, etc. The program ( ) operation of the processor is to configure these register data to the corresponding function modules of the AI engine. The surface_container describes the I/O data of the processor. The surface_container needs to contain as many surface_desc as there are processors in the AI engine. In the embodiment, there are only three processors, i.e., convolution, activation, and pooling. Taking convolution as an example, conv_surface_desc contains the description of input data, output data, weight data, and compressed data when there is data compression. The description describes data information from the aspects of data type, data address, data address offset, data size, data dimension, and space occupied by data and is used for the processor to read data or write data.

Figure 14:
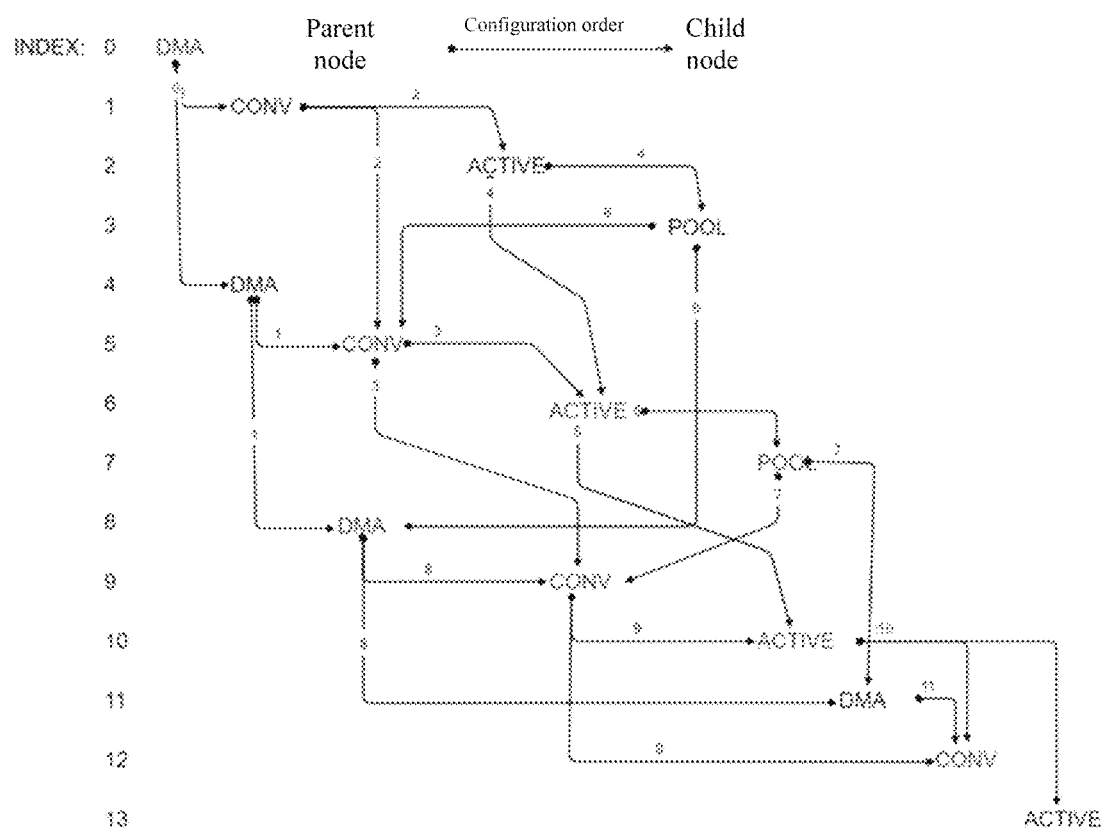
FIG. 14 is a schematic diagram of an inference process of a CNN provided by one or more embodiments of the present application.

In summary, the description data of the AI engine includes hardware information description of AI device→AI engine→processor→processor group, task description of device task→engine task, CNN description, operation description, and data description. These descriptions contain information of the processor pipeline, information of automatic scheduling of tasks, and information of dependencies between tasks. The whole description is an abstraction of hardware, CNNs, tasks, operations, and data, abstracting the complex task scheduling logic and hardware configuration logic into update iterations of data. Therefore, the whole CNN inference process is converted into a process that the processor in the AI engine is continuously scheduled, configured, and enabled to execute. The dependency_desc describes a call enabling logic of the processor, the operation_desc describes register group configuration information of the processor, and the surface_desc describes information of the I/O data of each processor. The information is generated by the master through a compiler according to the hardware configuration and an already trained CNN. The master writes these data into the data storage space of the AI engine, then combines addresses of various data into the address_list, and stores the addresses of the address_list and the number of the addresses in the address_list in the device task. The Network_desc describes an index number of these data addresses in the address_list. An address of the Network_desc itself is stored in the address_list at position 0. Referring to FIG. 14, it shows a process of a computation flow for converting a lenet model into the processor of the AI engine. INDEX is the index of the processor, and the inference of a lenet CNN may be completed through 14 times of 4 processor's executions in turn.

It can be seen that after acquiring the devcie task, the task scheduler needs to first acquire the Network_desc (i.e., network description data) from the position 0 of the address_list, and then acquire a storage address of relevant data from the address_list according to an index number in the Network_desc and store same in the engine_task. The processor on the AI Engine reads the address from the engine_task and assigns to the data address in the surface_desc when performing inference. The processor reads the relevant data from the storage space according to the address, offset, size, and type of the data.

At S102, a dependency relationship between the network layer tasks is determined on the basis of the network description data.

When the task scheduler performs task scheduling, it needs to perform scheduling according to the dependency relationship of each of the network layer tasks, and the dependency relationship describes a sequential order of each of the network layer tasks. The embodiment does not define a specific manner for determining the dependency relationship. For example, in one implementation, network description sub-data corresponding to each of the network layer tasks is determined from the network description data, and the network description sub-data is parsed to obtain corresponding next network layer pointers (i.e., a pointer consumer_ptr of a next operation of the processor in the above-mentioned processor description data). The dependency relationship is obtained on the basis of the next network layer pointers.

At S103, an idle register group on the artificial intelligence accelerated computing component is detected.

As previously described, each function module on the artificial intelligence accelerated computing component corresponds to at least two register groups. For example, in one preferred implementation, each processor corresponds to two ping-pong register groups. The idle register group in the present application refers to a register group without data and a register group storing register group data corresponding to a network layer task that has been completely executed. The detection of the idle register group may be performed in real time, according to a preset period, or when an interruption is detected (i.e., when a network layer task is completed) so as to load the register group data when using other non-idle register groups for inference, and improve efficiency.

Specifically, in one implementation, if in an initialization phase, all register groups may be determined to have no valid data. Therefore, all register groups on the artificial intelligence accelerated computing component may be determined to be the idle register groups, and all register groups may be configured. After an initialization configuration is complete, the artificial intelligence accelerated computing component may also be started so as to begin model inference. If not in the initialization phase and a target network layer task completion notification is detected, it indicates that the target network layer task is completely executed, and the register data in the corresponding register group is invalid. In this case, a second function module corresponding to the target network layer task is first determined. An idle register group identification (i.e., id) corresponding to a type of the second function module in the network description data is updated on the basis of the type of the second function module, and the idle register group corresponding to the second function module is determined according to the updated idle register group identification. It will be appreciated that the idle register group is one of two ping-pong register groups corresponding to the second function module.

It should be noted that after the configuration is completed, each function module needs to be enabled first. After the enabling is completed, the function module (i.e., a first function module in S105) satisfying the condition is started. Operations such as data loading may be completed during the process from enabling to starting, improving the degree of parallelism, and thereby improving the computing efficiency. In one implementation, an enabling order corresponding to each of target function modules on the artificial intelligence accelerated computing component may be determined on the basis of the dependency relationship. The target function module may be any function module, and the enabling order is an order in the same direction as the dependency relationship. Each of the target function modules is enabled on the basis of a reverse order of the enabling order so that an enabled target function module performs a data computing preparation operation on the basis of a corresponding non-idle register group. The function module to be executed later is first enabled so that the function module to be started later is prepared in advance, and data processing may be performed directly when starting, without performing the data computing preparation operation. The data computation preparation operation may be an operation such as data loading, and deformation, without being limited.

At S104, a target register configuration is generated on the basis of the dependency relationship, the network description data, and a type of the idle register group and written into the idle register group.

After an idle register group is detected, it needs to be configured. The embodiment does not define a specific configuration manner. In one implementation, the execution of network layer tasks has a sequential order, and each function module may only execute its corresponding type of network layer task. In this case, when generating the target register configuration, a candidate network layer task matching the type of the idle register group may be determined on the basis of the dependency relationship. The type of the idle register group is a type of a corresponding function module, such as convolution, activation, and pooling. The candidate task matching the type may be determined according to the type, such as a task corresponding to a convolution layer or a task corresponding to a pooling layer. Candidate description sub-data corresponding to the candidate network layer task, i.e., data related to the network layer task, is determined in the network description data, and then the target register configuration is generated using the candidate description sub-data and the hardware architecture description data corresponding to the artificial intelligence accelerated computing component. Specifically, corresponding register configuration data is generated on the basis of data such as operation_container and suface_container.

At S105: if a target network layer task completion notification is detected, on the basis of the dependency relationship, a next task of a target network layer task corresponding to the target network layer task completion notification is determined, and the next task is started on a corresponding first function module on the artificial intelligence accelerated computing component so as to execute the next task.

If the target network layer task completion notification (i.e., interruption) is detected, it indicates that the target network layer task is completely executed, and the target network layer task may be any network layer task. In response to detecting the target network layer task completion notification, on the basis of the dependency relationship, the next task of the target network layer task corresponding to the target network layer task completion notification is determined. That is, according to the dependency relationship, the next network layer task corresponding to the task, namely, the next task, may be determined. Since the inference of the target network layer is performed in series, an output of a previous network layer task is an input of a next network layer task. For one target neural network, input data corresponding thereto is processed successively by various network layer tasks to obtain one output. In one implementation, in order to improve efficiency, for multiple input data, each input data may correspond to different network layer tasks of the target neural network. In this case, different input data may be processed using different function modules at one moment to achieve the effect of parallel processing, thereby improving the computing efficiency. However, for the input data, each of the network layer tasks involved therein are executed at different moments. Therefore, for the input data, as long as the target network layer is not the last network layer, there must be its corresponding next task.

Since the register configurations in all register groups in the present application are valid data (because the idle register is configured as soon as it is detected), the register configuration corresponding to the next task has already been written. In this case, the next task may be executed directly. Specifically, according to the type of the next task, a first function module corresponding thereto on the artificial intelligence accelerated computing component may be determined, and then the first function module is started. The first function module may execute the next task according to the register configuration. The embodiment does not define a specific manner for determining the next task. In one implementation, the next task may be determined using the above-mentioned dependency_count. Specifically, the target network layer task completion notification may be parsed to obtain a task identification (for example, an event number) corresponding to the target network layer task, and subsequent tasks corresponding to the target network layer task are determined using the task identification on the basis of the dependency relationship. The subsequent task refers to a task that needs to be executed after the target network layer task, and the specific number is not limited. An execution wait count (dependency_count) corresponding to each of the subsequent tasks is reduced by one, and a target subsequent task that reduces the execution wait by one to zero is determined to be the next task. Reducing the execution wait by one to zero indicates that the target subsequent task needs to be executed immediately.

Figure 15:
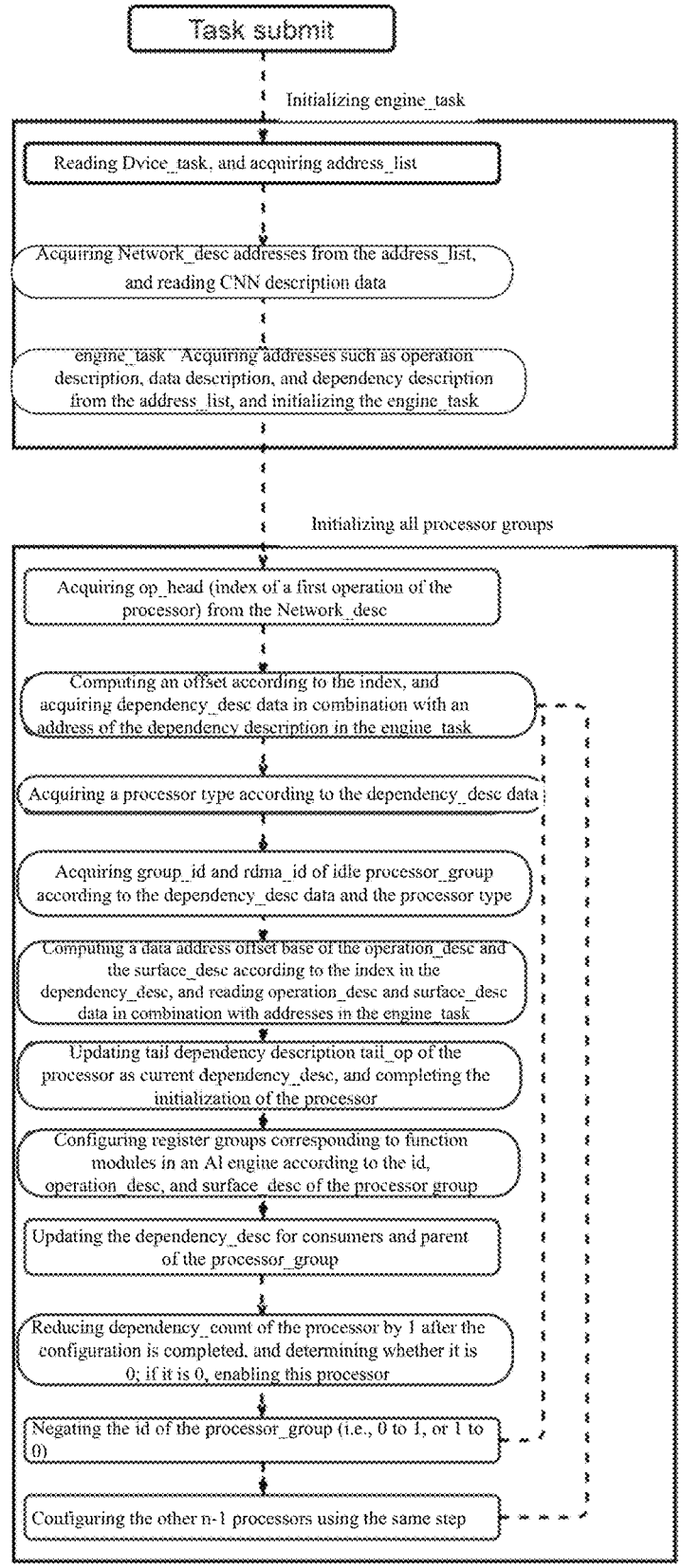
FIG. 15 is a specific task scheduling flowchart provided by one or more embodiments of the present application.

Referring to FIG. 15, it is a specific task scheduling flowchart provided by an embodiment of the present application. It describes a process of initialization, including initialization of the AI engine task as well as initialization and register group configuration of processor groups. Specifically, the initialization of the AI engine task includes the following steps. The master issues the task data to a storage space of a slave end, notifies a processor of the slave end to start parsing the task through the interruption, and starts the AI engine task scheduler for task scheduling. The scheduler reads the issued device_task data and obtains an address in the address_list and the number of addresses in the address_list.

The initialization and register group configuration of the processor groups includes the following steps. An address of Network_desc is read from position 0 in the address_list, and Network_desc data is read. Addresses such as operation_des, surface_desc, dependency_desc, and lut_list are read according to the address index described by the Network_desc, and an engine_task data structure is initializd with these addresses. In addition, the scheduler may also read op_head from the Network_desc. The op_head indicates an index of a first dependency_desc of each processor, computes an offset address offset of the dependency_desc of the current processor according to data sizes of the index and the dependency_desc, then obtains the read address of the dependency_desc according to dependency_graph_addr in the engine_task, and then reads the data. The op_type of the current processor is acquired according to the read dependency_desc. The op_type is a number of the processor, and if there are n processors, then 0<=op_type<=n−1. The scheduler acquires an id of an idle register group of the processor group and whether to read an id of rdma according to the dependency_desc and the processor, computes the address offset according to the index in the dependency_desc, a data type size of the operation_desc, and a data type size of the surface_desc, and then according to operation_desc_addr and surface_desc_addr in the engine_task, computes and reads specific addresses of the two types of data. The scheduler initializes the current processor group with the data read above and starts configuring the function module of the AI engine corresponding to the current processor. The scheduler updates tail_op of the current processor representing the tail dependency_desc as current dependency data for finding the index of the consumers of the current processor. The dependency_count of the current processor is reduced by 1 and determined whether it is 0. If it is 0, the function module of the AI engine corresponding to the processor is enabled to start an operation. The scheduler negates the id of the current processor group, configures another register group according to the above steps, and configures other n−1 processors according to the above steps.

It can be seen that after running the above steps, all register groups of all processors have been configured, and a first processor to be run is enabled. Interruptions may be generated during configuration, and an interrupt service program is entered to generate a corresponding interruption event number. However, an interruption event processing program is not entered immediately. The interruption event must be processed after 2 register groups of all processors have been configured. This mechanism is more versatile and applied to all AI engines with different architectures.

Figure 16:
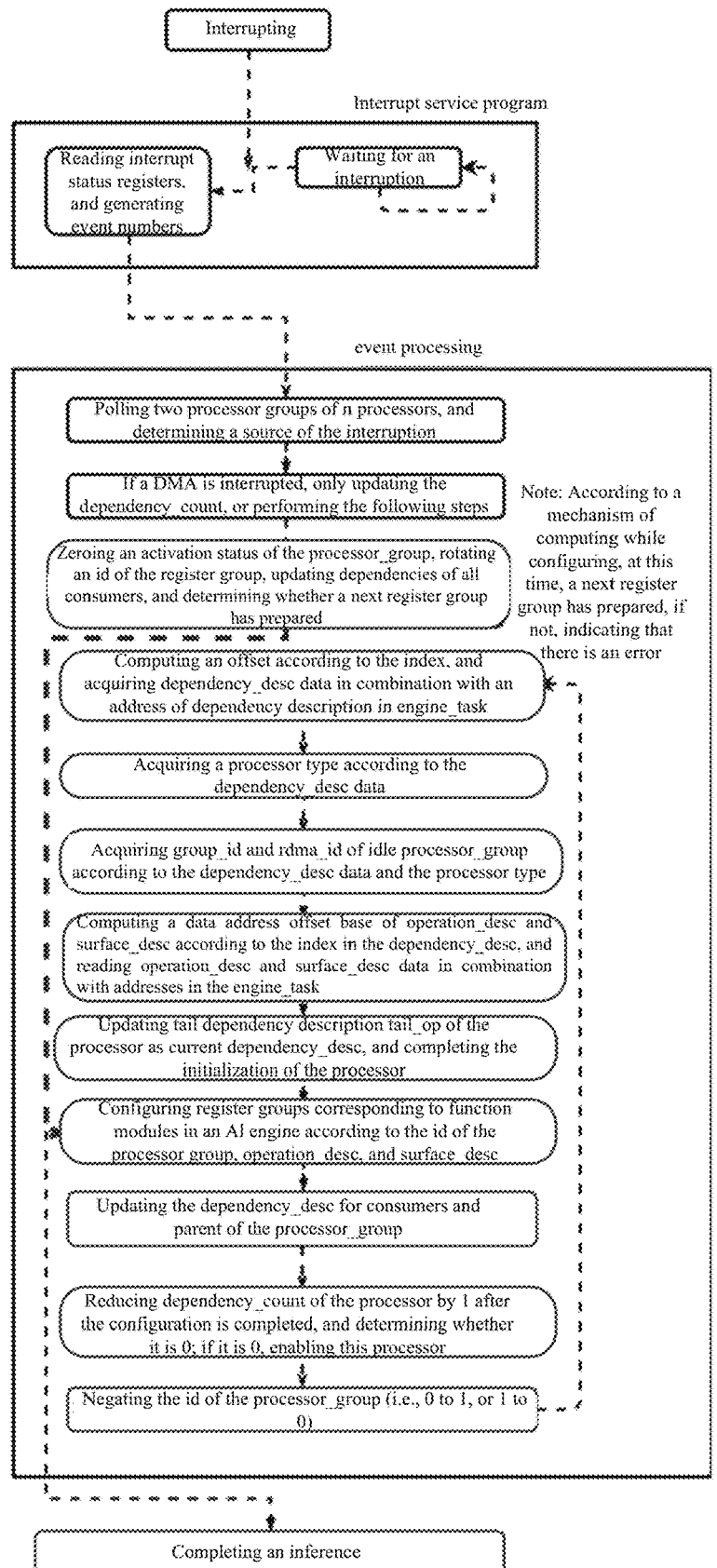
FIG. 16 is a specific interruption processing flowchart provided by one or more embodiments of the present application.

Referring to FIG. 16, it is a specific interruption processing flowchart provided by an embodiment of the present application. The interruption service program is a program that executes immediately after an interrupt is generated. The program reads interrupt status registers of the AI engine, determines the type of the processor, and generates a corresponding event number. The interrupt status registers are then cleared to zero. The current event is stored in the event of the processor group, and event_flag is set to 1. Specifically, the event processing program is located in a while (1) loop, and then jumps out of the while loop when the task execution completes. The event processing program is located after the process group initialization and register configuration program. When the event processing program finds that the event_flag is 1, firstly the event_flag is cleared to zero, then two processor groups of all processors are polled to determine which processor group generates an interruption, and corresponding processing is performed accordingly. If the DMA reads image data or weight data is interrupted, dependencies of all consumers of the current processor group will be updated directly. If other processors are interrupted, the group id is first rotated, and the dependencies of all consumers are updated. The scheduler then begins to configure the processor group register group corresponding to the current group id. It should be noted that, according to the above logic, the configuration data of the register group of the current group has been read, and the processor group is ready, which is also a mechanism for masking a processor configuration process with a processor operation process so that the processor may convert the execution of two tasks without any gap. The scheduler updates the dependencies of all consumers and enables if there is a processor with dependency_count of 0. The scheduler switches the processor group and runs the initialization step responded in the initialization and register group configuration process of processor groups until the last interruption is generated. The number of operations of running is equal to the number of operations in Netwok_desc, indicating that the task is completed. The slave end generates an interruption to notify the master to read a final result.

In summary, the consumer and parent of the process group convert the whole inference process into the pipeline of the processor group, update dependencies of consumers and parents of all process groups after the register group is configured or the interruption is generated, and enable the processor when dependency_count is 0.

Applying the computing task scheduling method provided in the embodiments of the present application, utilizing the feature that CNN is composed of multiple identical or similar convolution layers, and various computations in the convolution layers may be processed in a pipeline (i.e., pipeline processing), and in combination with the hardware configuration of the AI engine, the computing tasks are efficiently scheduled to improve the computing efficiency. After acquiring the network description data, if it is determined that there is an idle register group, on the basis of the dependency relationship and the type of the idle register group, the target register configuration matching the idle register group is generated using the network description data and written into the idle register group. In addition, when the target network layer task completion notification is detected, a next task of the pipeline processing is determined according to the dependency relationship. The idle register group is configured immediately after it is detected, and each function module corresponds to at least two register groups, and a configuration duration of the register is shorter than a duration when the function module uses the register to perform data processing. Therefore, at any time, each function module corresponds to at least one non-idle register group. Therefore, when it is detected that the target network layer task is completed and the next task is determined, the first function module corresponding to the next task may be started immediately so that pipeline processing can be performed seamlessly, improving the computing efficiency. At the same time, since the registers of the function modules are well configured, multiple function modules may be computed in parallel, making full use of hardware resources and improving the computing efficiency. In addition, the configuration of the registers and the running of the function modules may be performed in parallel. In the running process of a certain function module, the idle register group may be configured, or data read and write operations may be performed by other register groups, so as to make full use of the bus bandwidth, avoid the delay caused by the sudden mass data transmission requirements, and improve the computing efficiency.

A computing task scheduling apparatus provided by an embodiment of the present application is described below, and the computing task scheduling apparatus described below and the computing task scheduling method described above may be referred to correspondingly.

Figure 17:
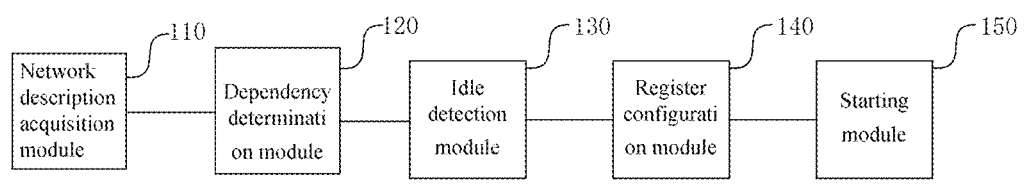
FIG. 17 is a schematic structural diagram of a computing task scheduling apparatus provided by one or more embodiments of the present application.

Referring to FIG. 17, it is a schematic structural diagram of a computing task scheduling apparatus provided by an embodiment of the present application, applied to a task scheduler, including:

a network description acquisition module 110, configured to acquire network description data, the network description data being used for describing network layer tasks corresponding to each of network layers in a target neural network;

a dependency determination module 120, configured to determine a dependency relationship between the network layer tasks on the basis of the network description data;

an idle detection module 130, configured to detect an idle register group on an artificial intelligence accelerated computing component, each function module on the artificial intelligence accelerated computing component corresponding to at least two register groups;

a register configuration module 140, configured to generate a target register configuration on the basis of the dependency relationship, the network description data, and a type of the idle register group, and write the target register configuration into the idle register group; and a starting module 150, configured to if a target network layer task completion notification is detected, determine, on the basis of the dependency relationship, a next task of a target network layer task corresponding to the target network layer task completion notification, and start the next task on a corresponding first function module on the artificial intelligence accelerated computing component so as to execute the next task.

Optionally, the computing task scheduling apparatus includes:

a hardware architecture determination module, configured to determine a hardware architecture of the artificial intelligence accelerated computing component;

a hardware description generation module, configured to generate corresponding hardware architecture description data on the basis of the hardware architecture; and a network description generation module, configured to acquire the target neural network, and generate the network description data on the basis of the target neural network and the hardware architecture description data.

Optionally, the network description generation module includes:

a model parsing unit, configured to perform model parsing on the target neural network to obtain an intermediate graph;

an optimization unit, configured to perform graph optimization processing on the intermediate graph on the basis of the hardware architecture description data to obtain an optimized graph; and a compiling unit, configured to compile the optimized graph to obtain the network description data.

Optionally, the network description generation module includes:

a dependency determination unit, configured to determine each of the network layers in the target neural network and the dependency relationship between the network layers;

an acquisition unit, configured to acquire preset network layer description data corresponding to each network layer; and a generation unit, configured to generate the network description data on the basis of the dependency relationship using the preset network layer description data.

Optionally, the dependency determination module 120 includes:

a sub-data determination unit, configured to determine, from the network description data, network description sub-data corresponding to the network layer tasks;

a pointer acquisition unit, configured to parse the network description sub-data to obtain corresponding next network layer pointers; and a relationship generation unit, configured to obtain the dependency relationship on the basis of the next network layer pointers.

Optionally, the idle detection module 130 includes:

an initial detection unit, configured to, if in an initialization phase, determine all register groups on the artificial intelligence accelerated computing component to be the idle register groups;

a module determination unit, configured to, if not in the initialization phase and the target network layer task completion notification is detected, determine a second function module corresponding to the target network layer task;

an identification acquisition unit, configured to update an idle register group identification corresponding to a type of the second function module in the network description data on the basis of the type of the second function module; and an idle determination unit, configured to determine the idle register group corresponding to the second function module according to the updated idle register group identification, where the idle register group is one of two ping-pong register groups corresponding to the second function module.

Optionally, the register configuration module 140 includes:

a candidate determination unit, configured to determine a candidate network layer task matching the type of the idle register group on the basis of the dependency relationship;

a sub-data acquisition unit, configured to determine candidate description sub-data corresponding to the candidate network layer task in the network description data; and a configuration generation unit, configured to generate the target register configuration using the candidate description sub-data and the hardware architecture description data corresponding to the artificial intelligence accelerated computing component.

Optionally, the starting module 150 includes:

an identification determination unit, configured to parse the target network layer task completion notification to obtain a task identification corresponding to the target network layer task;

a subsequent task determination unit, configured to determine subsequent tasks corresponding to the target network layer task using the task identification on the basis of the dependency relationship;

an update unit, configured to reduce an execution wait count corresponding to each of the subsequent tasks by one; and a next task determination unit, configured to determine a target subsequent task that reduces the execution wait by one to zero to be the next task.

Optionally, the starting module 150 also includes:

an enabling order determination module, configured to determine an enabling order corresponding to each of target function modules on the artificial intelligence accelerated computing component on the basis of the dependency relationship; and an enabling module, configured to enable each of the target function modules on the basis of a reverse order of the enabling order so that an enabled target function module performs a data computing preparation operation on the basis of a corresponding non-idle register group.

An electronic device provided by an embodiment of the present application is described below, and the electronic device described below and the computing task scheduling method described above may be referred to correspondingly.

Figure 18:
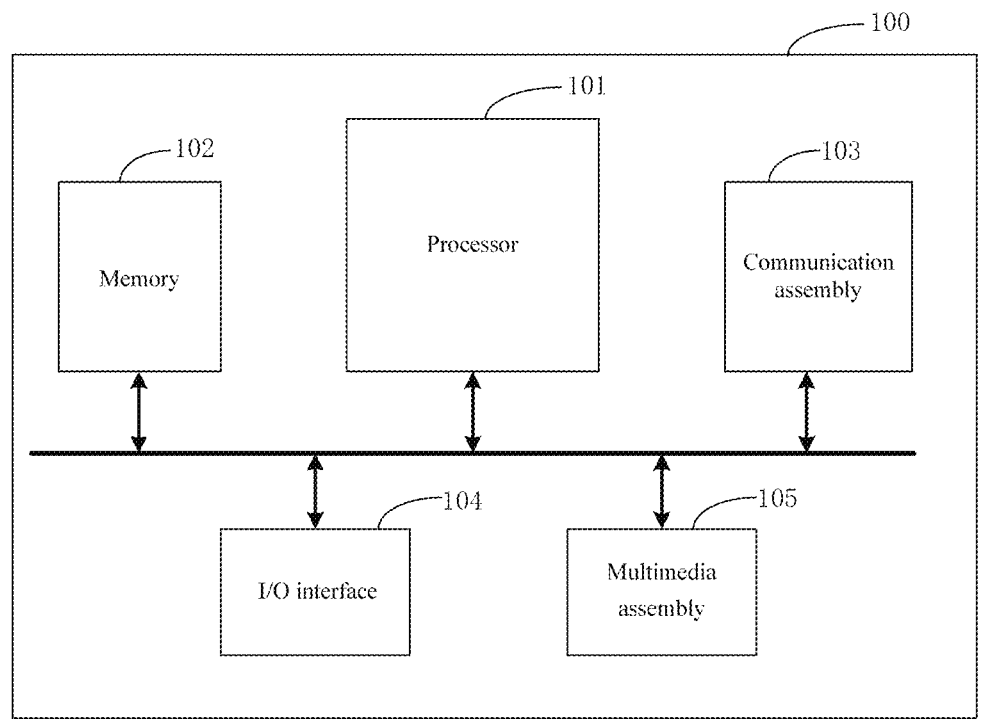
FIG. 18 is a schematic structural diagram of an electronic device provided by one or more embodiments of the present application.

Referring to FIG. 18, it is a schematic structural diagram of an electronic device provided by an embodiment of the present application. An electronic device 100 may include one or more processors 101 and a memory 102 and may further include one or more of a multimedia assembly 103, an information I/O interface 104, and a communication assembly 105.

The processor 101 is configured to control the overall operation of the electronic device 100 to complete all or some of the steps in the above-mentioned computing task scheduling method. The memory 102 is configured to store various types of data to support operations on the electronic device 100. The data may include, for example, instructions of any application program or method operating on the electronic device 100 as well as application program-related data. The memory 102 may be implemented by any type or combination of volatile or non-volatile storage devices, such as one or more of a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The multimedia assembly 103 may include a screen and an audio assembly. The screen may be, for example, a touch screen, and the audio assembly is configured to output and/or input an audio signal. For example, the audio assembly may include a microphone, and the microphone is configured to receive an external audio signal. The received audio signal may be further stored in the memory 102 or transmitted through the communication assembly 105. The audio assembly also includes at least one speaker configured to output the audio signal. The I/O interfaces 104 provide interfaces between the processor 101 and other interface modules. The above-mentioned other interface modules may be a keyboard, a mouse, buttons, etc. These buttons may be virtual buttons or physical buttons. The communication assembly 105 is used for wired or wireless communication between the electronic device 100 and other devices. The wireless communication includes one of Wi-Fi, bluetooth, near field communication (NFC), 2G, 3G, or 4G, or a combination of several of them. Accordingly, the communication assembly 105 may include: a Wi-Fi component, a bluetooth component, and an NFC component.

The electronic device 100 may be implemented by one or more of an application specific integrated circuit (ASIC), a digital signal processor (DSP), a digital signal processing device (DSPD), a programmable logic device (PLD), a digital signal processing device (DSPD), a programmable logic device (PLD), a field programmable gate array (FPGA), a controller, a microcontroller, a microprocessor, or other electronic elements for performing the computing task scheduling method presented in the above-mentioned embodiments.

A computer readable storage medium provided by an embodiment of the present application is described below, and the computer readable storage medium described below and the computing task scheduling method described above may be referred to correspondingly.

The present application also provides one or more non-volatile computer readable storage media storing computer readable instructions which, when executed by one or more processors, cause the one or more processors to perform the steps of the computing task scheduling method. The computer readable storage media store computer readable instructions which, when executed by the processor, perform the steps of the above-mentioned computing task scheduling method.

The computer readable storage media may include various media that may store the program code, such as a USB flash disk, a removable hard disk, a ROM, a random access memory (RAM), a magnetic disk, or an optical disk.

Various embodiments in this specification are described in a progressive manner, and each embodiment focuses on the differences with other embodiments, and the same or similar parts of the embodiments may refer to each other. For the apparatus disclosed in the embodiments, since it corresponds to the method disclosed in the embodiments, the description is relatively simple, and the description in the method section where relevant may be referred to.

A person skilled in the art will further appreciate that the units and algorithm steps of the examples described in connection with the embodiments disclosed herein may be implemented by electronic hardware, computer software, or combinations of the two. In order to clearly illustrate the interchangeability of hardware and software, the composition and steps of the examples have been described in the above description in general terms according to the functions. Whether these functions are performed in hardware or software depends on the particular application and design constraints of the technical solutions. A person skilled in the art may use different methods for each particular application to achieve the described functions, but such implementations should not be considered beyond the scope of the present application.

The steps of the method or algorithm described in connection with the embodiments disclosed herein may be implemented directly in hardware, in a software module executed by the processor, or in a combination of the two. The software module may be placed in a RAM, a memory, a ROM, an electrically programmable ROM, an electrically erasable programmable ROM, a register, a hard disk, a removable disk, a CD-ROM, or any other form of storage medium known in the art.

Finally, it should also be noted that relationship terms such as first and second herein are used solely to distinguish one entity or operation from another entity or operation without necessarily requiring or implying any actual such relationship or order between these entities or operations. Moreover, the terms comprising, containing, or any other variation thereof, are intended to cover a non-exclusive inclusion, such that a process, a method, an article, or a device that includes a list of elements does not include only those elements but may include other elements not expressly listed or inherent to such process, method, article, or device.

While the principles and implementations of the present application have been described herein with reference to specific examples, the description of the above embodiments is only used to help understand the method and core ideas of the present application. At the same time, for a person skilled in the art, according to the idea of the present application, there would be changes in the specific implementations and the application scope. In summary, the contents of the present description should not be construed as limiting the present application.

What is claimed is:

1. A computing task scheduling method, applied to a task scheduler, the computing task scheduling method comprising:
    acquiring network description data, describing network layer tasks corresponding to each of network layers in a target neural network;
    determining a dependency relationship between the network layer tasks on the basis of the network description data;
    detecting an idle register group on an artificial intelligence accelerated computing component, each function module on the artificial intelligence accelerated computing component corresponding to at least two register groups, wherein the at least two register groups are configured to receive a configuration information of the each function module and a hardware controller is configured to control an operation of the each function module according to the configuration information, wherein the idle register group comprises a register group without data or a register group storing register group data corresponding to a network layer task that has been completely executed;
    in response to detecting the idle register group, generating a target register configuration on the basis of the dependency relationship, the network description data, and a type of the idle register group, and writing the target register configuration into the idle register group, wherein the in response to detecting the idle register group, generating a target register configuration on the basis of the dependency relationship, the network description data, and a type of the idle register group comprises:
  in response to detecting the idle register group, determining a candidate network layer task matching the type of the idle register group on the basis of the dependency relationship;
  in response to determining the candidate network layer task, determining candidate description sub-data corresponding to the candidate network layer task in the network description data;
  in response to determining the candidate description sub-data, generating the target register configuration using the candidate description sub-data and a hardware architecture description data corresponding to the artificial intelligence accelerated computing component; and
  in response to detection of a target network layer task completion notification, determining a next task of a target network layer task corresponding to the target network layer task completion notification on the basis of the dependency relationship, and starting the next task on a corresponding first function module on the artificial intelligence accelerated computing component so as to execute the next task;
    wherein the detecting the idle register group on the artificial intelligence accelerated computing component comprises:
      in response to being in an initialization phase, determining all register groups on the artificial intelligence accelerated computing component to be the idle register groups;
      in response to not being in the initialization phase and detecting the target network layer task completion notification, determining a second function module corresponding to the target network layer task;
      updating an idle register group identification corresponding to a type of the second function module in the network description data on the basis of the type of the second function module; and
      determining the idle register group corresponding to the second function module according to the updated idle register group identification, wherein the idle register group is one of two ping-pong register groups corresponding to the second function module.

2. The computing task scheduling method according to claim 1, wherein a generation process of the network description data comprises:
  determining a hardware architecture of the artificial intelligence accelerated computing component;
  generating corresponding hardware architecture description data on the basis of the hardware architecture; and
  acquiring the target neural network, and generating the network description data on the basis of the target neural network and the hardware architecture description data.

3. The computing task scheduling method according to claim 2, wherein the generating the network description data on the basis of the target neural network and the hardware architecture description data comprises:
  performing model parsing on the target neural network to obtain an intermediate graph;
  performing graph optimization processing on the intermediate graph on the basis of the hardware architecture description data to obtain an optimized graph; and
  compiling the optimized graph to obtain the network description data.

4. The computing task scheduling method according to claim 2, wherein the generating the network description data on the basis of the target neural network and the hardware architecture description data comprises:
  determining each of the network layers in the target neural network and the dependency relationship between the network layer tasks;
  acquiring preset network layer description data corresponding to each network layer; and
  generating the network description data on the basis of the dependency relationship using the preset network layer description data.

5. The computing task scheduling method according to claim 2, wherein the generating corresponding hardware architecture description data on the basis of the hardware architecture comprises:
  generating corresponding hardware architecture description data on the basis of the hardware architecture and a preset generation rule.

6. The computing task scheduling method according to claim 2, wherein the generating corresponding hardware architecture description data on the basis of the hardware architecture comprises:
  determining corresponding hardware architecture description data from pre-stored preset hardware architecture description datum corresponding to various hardware architectures on the basis of hardware architecture.

7. The computing task scheduling method according to claim 2, wherein the hardware architecture description data comprises a configuration data required for initialization, a pointer described by an artificial intelligence engine, and a task description data processed by an artificial intelligence device.

8. The computing task scheduling method according to claim 7, wherein the task description data comprises an input data of each of a series of subtasks and an output data of each of a series of subtasks.

9. The computing task scheduling method according to claim 7, wherein the pointer points to a device to which a task belongs.

10. The computing task scheduling method according to claim 7, wherein the configuration data comprises a base address of the artificial intelligence device on a system bus, an interruption number of the artificial intelligence device in the system, an artificial intelligence device platform pointer, and a number of the artificial intelligence engine contained on the artificial intelligence device.

11. The computing task scheduling method according to claim 1, wherein that the determining a dependency relationship between the network layer tasks on the basis of the network description data comprises:
  determining network description sub-data corresponding to the network layer tasks from the network description data;
  parsing the network description sub-data to obtain corresponding next network layer pointers; and
  obtaining the dependency relationship on the basis of the next network layer pointers.

12. The computing task scheduling method according to claim 1, wherein the determining a next task of a target network layer task corresponding to the target network layer task completion notification on the basis of the dependency relationship comprises:
  parsing the target network layer task completion notification to obtain a task identification corresponding to the target network layer task;

determining subsequent tasks corresponding to the target network layer task using the task identification on the basis of the dependency relationship;

reducing an execution wait count corresponding to each of the subsequent tasks by one; and determining a target subsequent task that reduces the execution wait by one to zero to be the next task.

13. The computing task scheduling method according to claim 1, wherein further comprising:

determining an enabling order corresponding to each of target function modules on the artificial intelligence accelerated computing component on the basis of the dependency relationship; and enabling each of the target function modules on the basis of a reverse order of the enabling order so that an enabled target function module performs a data computing preparation operation on the basis of a corresponding non-idle register group.

14. The computing task scheduling method according to claim 1, wherein the network layer tasks refer to tasks that infer and compute the network layers.

15. An electronic device, comprising:

a memory storing computer readable instructions; and one or more processors configured to execute the computer readable instructions, wherein upon execution of the computer readable instructions the one or more processors is configured to:

acquire network description data, describing network layer tasks corresponding to each of network layers in a target neural network;

determine a dependency relationship between the network layer tasks on the basis of the network description data;

detect an idle register group on an artificial intelligence accelerated computing component, each function module on the artificial intelligence accelerated computing component corresponding to at least two register groups, wherein the at least two register groups are configured to receive a configuration information of the each function module and a hardware controller is configured to control an operation of the each function module according to the configuration information, wherein the idle register group comprises a register group without data or a register group storing register group data corresponding to a network layer task that has been completely executed;

in response to the detection of the idle register group, generate a target register configuration on the basis of the dependency relationship, the network description data, and a type of the idle register group, and write the target register configuration into the idle register group, wherein in order to generate the target register configuration on the basis of the dependency relationship, the network description data, and the type of the idle register group, the one or more processors is configured to:

in response to the detection of the idle register group, determine a candidate network layer task matching the type of the idle register group on the basis of the dependency relationship;

in response to the determination of the candidate network layer task, determine candidate description sub-data corresponding to the candidate network layer task in the network description data; and in response to the determination of the candidate description sub-data, generate the target register configuration using the candidate description sub-data and a hardware architecture description data corresponding to the artificial intelligence accelerated computing component; and in response to detection of a target network layer task completion notification, determine a next task of a target network layer task corresponding to the target network layer task completion notification on the basis of the dependency relationship, and start the next task on a corresponding first function module on the artificial intelligence accelerated computing component so as to execute the next task;

wherein the detection of the idle register group on the artificial intelligence accelerated computing component comprises:

in response to being in an initialization phase, determine all register groups on the artificial intelligence accelerated computing component to be the idle register groups;

in response to not being in the initialization phase and detection of the target network layer task completion notification, determine a second function module corresponding to the target network layer task;

update an idle register group identification corresponding to a type of the second function module in the network description data on the basis of the type of the second function module; and determine the idle register group corresponding to the second function module according to the updated idle register group identification, wherein the idle register group is one of two ping-pong register groups corresponding to the second function module.

16. One or more non-volatile computer readable storage media storing computer readable instructions, wherein the computer readable instructions, when executed by one or more processors, are configured to cause the one or more processors to:

acquire network description data, describing network layer tasks corresponding to each of network layers in a target neural network;

determine a dependency relationship between the network layer tasks on the basis of the network description data;

detect an idle register group on an artificial intelligence accelerated computing component, each function module on the artificial intelligence accelerated computing component corresponding to at least two register groups, wherein the at least two register groups are configured to receive a configuration information of the each function module and a hardware controller controls an operation of the each function module according to the configuration information, wherein the idle register group comprises a register group without data or a register group storing register group data corresponding to a network layer task that has been completely executed;

in response to the detection of the idle register group, generate a target register configuration on the basis of the dependency relationship, the network description data, and a type of the idle register group, and write the target register configuration into the idle register group, wherein in order to generate a target register configuration on the basis of the dependency relationship, the network description data, and a type of the idle register group, the computer readable instructions cause the one or more processors to:

in response to the detection of the idle register group, determine a candidate network layer task matching the type of the idle register group on the basis of the dependency relationship;

in response to the determination of the candidate network layer task, determine candidate description sub-data corresponding to the candidate network layer task in the network description data; and in response to the determination of the candidate description sub-data, generate the target register configuration using the candidate description sub-data and a hardware architecture description data corresponding to the artificial intelligence accelerated computing component; and in response to detection of a target network layer task completion notification, determine a next task of a target network layer task corresponding to the target network layer task completion notification on the basis of the dependency relationship, and start the next task on a corresponding first function module on the artificial intelligence accelerated computing component so as to execute the next task;

wherein the detection of the idle register group on the artificial intelligence accelerated computing component comprises:

in response to being in an initialization phase, determine all register groups on the artificial intelligence accelerated computing component to be the idle register groups;

in response to not being in the initialization phase and detection of the target network layer task completion notification, determine a second function module corresponding to the target network layer task;

update an idle register group identification corresponding to a type of the second function module in the network description data on the basis of the type of the second function module; and determine the idle register group corresponding to the second function module according to the updated idle register group identification, wherein the idle register group is one of two ping-pong register groups corresponding to the second function module.

* * * * *